(12) United States Patent
Ishimoto

(10) Patent No.: US 8,355,178 B2
(45) Date of Patent: Jan. 15, 2013

(54) APPARATUS INCLUDING A DETERMINATION UNIT, AND METHOD AND PROGRAM INCLUDING A DETERMINATION STEP

(75) Inventor: Koichi Ishimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 12/401,005

(22) Filed: Mar. 10, 2009

(65) Prior Publication Data
US 2009/0244589 A1 Oct. 1, 2009

(30) Foreign Application Priority Data

Mar. 25, 2008 (JP) .................. 2008-078910

(51) Int. Cl.
H04N 1/40 (2006.01)
G03G 21/00 (2006.01)
(52) U.S. Cl. ..................... 358/3.28; 399/366
(58) Field of Classification Search ................ 358/1.14; 399/15; 382/173
See application file for complete search history.

(56) References Cited

U.S. PATENT DOCUMENTS

| 6,421,145 | B1 | 7/2002 | Kurita et al. |
| 7,057,775 | B2 | 6/2006 | Kurita et al. |
| 7,061,652 | B2 | 6/2006 | Kurita et al. |
| 7,509,060 | B2 | 3/2009 | Yaguchi et al. |
| 7,684,089 | B2 | 3/2010 | Yamada |
| 2006/0274939 | A1 | 12/2006 | Yamada |
| 2007/0003294 | A1 | 1/2007 | Yaguchi et al. |
| 2009/0034009 | A1* | 2/2009 | Johnson ............... 358/3.28 |

FOREIGN PATENT DOCUMENTS

| CN | 1893535 | 1/2007 |
| JP | 2001-197297 | 7/2001 |

OTHER PUBLICATIONS

Notification of First Office Action, issued Aug. 11, 2010, in Chinese Application No. 200910132309.5.

* cited by examiner

Primary Examiner — Thomas Lett
Assistant Examiner — Sunil Chacko
(74) Attorney, Agent, or Firm — Fitzpatrick, Cella, Harper & Scinto

(57) ABSTRACT

An object of the present invention is to reduce influences of showthrough where a copy-forgery-inhibited pattern is visualized after printing. In order to attain the above object, the apparatus of the present invention is provided with determination means for determining whether a setting for printing a copy-forgery-inhibited pattern image in which a character portion is rendered to a minor dot portion on both sides of a sheet is made and control means for controlling so that a warning screen is displayed where the determination means determines that the above setting has been made.

3 Claims, 21 Drawing Sheets (a)

VISUALIZATION (b)

WARNING !!

SETTING OF "A CHARACTER IS MADE TO BE OUTLINED CHARACTER" IS MADE BOTH ON FRONT SIDE AND REAR SIDE

EFFECT OF COPY-FORGERY-INHIBITED PATTERN MAY NOT BE ATTAINED ON PRINTED MATTER

IS PRINTING CONTINUED?

CONTINUE ~2001

RETURN ~2002

FIG.13

APPARATUS INCLUDING A DETERMINATION UNIT, AND METHOD AND PROGRAM INCLUDING A DETERMINATION STEP

BACKGROUND OF THE INVENTION

1. Field of the Invention

The present invention relates to an image processing apparatus. More specifically, the present invention relates to an apparatus, a method, and a program capable of handling an image which contains a copy-forgery-inhibited pattern image.

2. Description of the Related Art

A copy-forgery-inhibited pattern image (Japanese Patent Laid-Open No. 2001-197297) is known.

A copy-forgery-inhibited pattern image is an image to realize an effect that, where an original document having a copy-forgery-inhibited pattern image thereon is printed (e.g., after scanning to make a copy), predetermined characters or the like which are not recognized before the printing are visualized upon printing, to suppress the use of printing of a copy.

In order to realize the effect, a copy-forgery-inhibited pattern image to be generated includes two fundamental regions, that is, a region (major dot portion) at which an image identical to that on an original document remains upon printing a copy, and a region (minor dot portion) at which the image existing on the original document disappears upon the printing or thins in comparison with the image in the remaining region. In the copy-forgery-inhibited pattern image having these two regions, the two regions are substantially similar in density when the copy-forgery-inhibited pattern image is printed and output. Specifically, the thus printed and output copy-forgery-inhibited pattern image is processed in such a manner that it is difficult for humans to visually recognize macroscopic characters and others hidden upon printing an original.

An image region which is hidden upon printing an original document containing the copy-forgery-inhibited pattern image, but which appears so as to be recognized visually by humans upon printing a copy of the original document, is called a "major dot portion" or a "visualized portion."

Further, an image region which disappears upon printing a copy, or thins in density in comparison with a latent image visualized upon the printing of a copy, is called for descriptive purposes a "minor dot portion" or a "disappeared portion."

FIG. 1 is a view showing a state of dots at two image regions, that is, a major dot portion and a minor dot portion. As shown in FIG. 1, a copy-forgery-inhibited pattern image has a minor dot portion 101 at which dots are arranged dispersedly at a predetermined region and a major dot portion 102 at which dots are arranged in a concentrated manner. Dots which exist in the two regions, that is, the major dot portion 102 and the minor dot portion 101, can be generated by halftone dot processing or dithering that is different for the two regions.

For example, where the halftone dot processing is adopted to generate a copy-forgery-inhibited pattern image, the major dot portion 102 may be subjected to halftone dot processing at a lower number of lines per inch. Further, the minor dot portion 101 may be subjected to halftone dot processing at a higher number of lines per inch. Where dithering is adopted to generate a copy-forgery-inhibited pattern image, the major dot portion 102 may be subjected to dithering which uses a dot concentrated dither matrix. Further, the minor dot portion 101 may be subjected to dithering which uses a dot dispersion-print dither matrix.

Hereinafter, a fact that the minor dot portion disappears on printing and only the major dot portion appears (i.e., remains) is called visualization.

FIGS. 2 (a) and (b) are views showing the visualization. FIG. 2(b) is visualized upon printing a copy of the pattern shown in FIG. 2(a). FIGS. 2(a) and (b) show that where dots are arranged in a concentrated manner, they are visualized upon printing a copy, and where dots are arranged dispersedly, they are not reproduced upon printing a copy.

It is noted that copy-forgery-inhibited pattern printing shall not be limited to the above described constitution. Any constitution may be applicable as long as character strings or others can be reproduced so as to be recognized upon printing a copy. Specifically, as shown in FIG. 14, even if character strings or others are specified as a minor dot portion and shown in a state of outlined characters upon printing, the copy-forgery-inhibited pattern printing attains its aim.

Further, as shown in FIG. 17, hereinafter, a part of a copy-forgery-inhibited pattern containing characters is called a "character portion" of the copy-forgery-inhibited pattern (1701) and a part other than the part of the copy-forgery-inhibited pattern containing characters is called a "non-character portion" of the copy-forgery-inhibited pattern (1702).

In considering a copy-forgery-inhibited pattern, it is important to recognize that a dense part printed on one side of a sheet has showthrough on the other side (reverse side).

For example, in FIG. 18, a character portion 1805 is a minor dot portion on the front side 1801 of a document, while character portions 1806 and 1807 are minor dot portions on the rear side 1802 of the document. In such a case, the character portion 1805 on the front side 1801 of the document is rendered to a state of 1808 on printing and has disappeared. However, a non-character portion on the rear side 1802 of the document remains dense upon printing, and thereby this remaining dense part has showthrough. As a result, the minor dot portion 1808 which should be white is not white. As a result, the character portion 1808 on the front side of the printing is less likely to be distinguished from the periphery thereof. This is also true for the rear side. It is noted that since FIG. 16 shows the same thing as that shown in FIG. 18, the description thereof will be omitted here.

On the other hand, in FIG. 19, a character portion 1905 is a major dot portion on the front side 1901 of a document while character portions 1906 and 1907 are major dot portions on the rear side 1902 of the document. In such a case, the character portion 1905 on the front side 1901 of the document is rendered to a state of 1908 on printing and has been visualized. Further, the character portions 1906 and 1907 on the rear side 1902 of the document remain dense upon printing, and thereby the part which remains dense has showthrough. However, on the front side of the printed copy, the character portion 1908 is reliably distinguished from the periphery, although this showthrough influences the character portion. This is also true for the rear side. It is noted that since FIG. 15 shows the same thing as that shown in FIG. 19, the description thereof will be omitted here.

An object of the present invention is to provide an apparatus capable of preventing a failure in distinguishing a character portion in a copy-forgery-inhibited pattern image from the periphery thereof due to showthrough after printing a copy.

SUMMARY OF THE INVENTION

In order to solve the above problem, the apparatus of the present invention includes determination means for determining whether a setting is made for printing a copy-forgery-inhibited pattern image in which a character portion is rendered to a minor dot portion on both sides of a sheet and control means for controlling so that a warning screen is displayed where it is determined that the setting has been made by the determination means.

According to the present invention, it is possible to reduce the influence of showthrough where a copy-forgery-inhibited pattern is visualized after printing.

Further features of the present invention will become apparent from the following description of exemplary embodiments (with reference to the attached drawings).

BRIEF DESCRIPTION OF THE DRAWINGS

FIG. 13 is a view showing a screen of the user interface of the image forming apparatus;

DESCRIPTION OF THE EMBODIMENTS

Hereinafter, a description will be given of one embodiment of the present invention in detail with reference to the drawings.

First Embodiment

Appearance of Image Forming Apparatus

Figure 1:
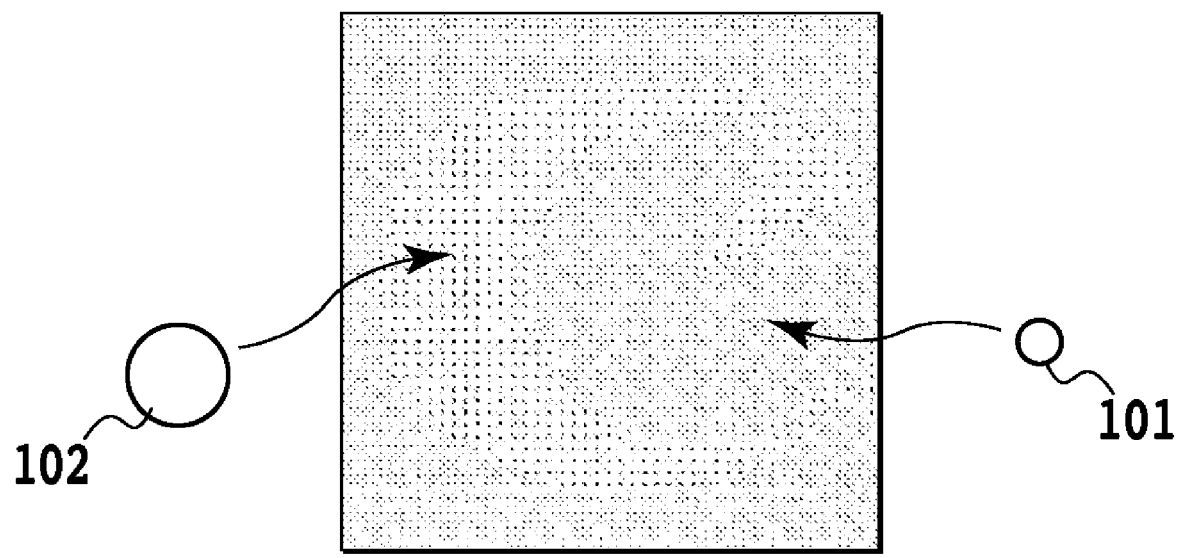
FIG. 1 is a view showing a state of dots in a copy-forgery-inhibited pattern image.
Figure 2:
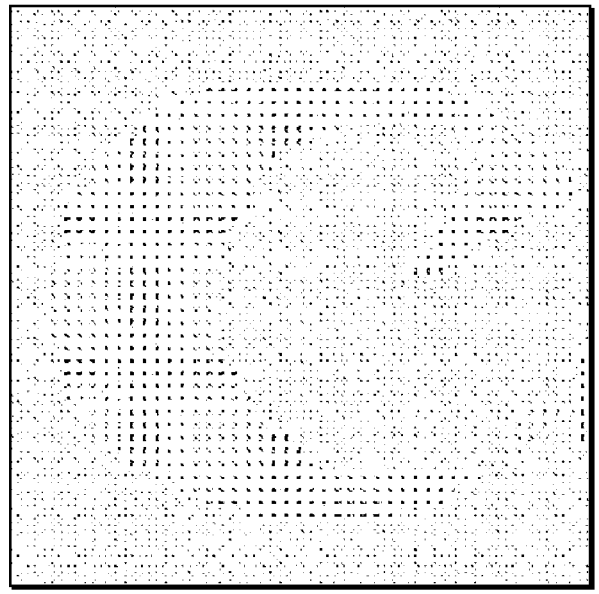
FIG. 2 is a view showing a state that the copy-forgery-inhibited pattern image is visualized on printing.
Figure 2:
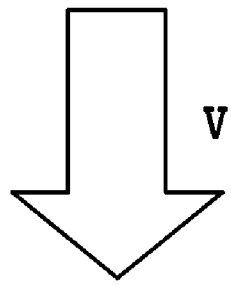
Figure 2:
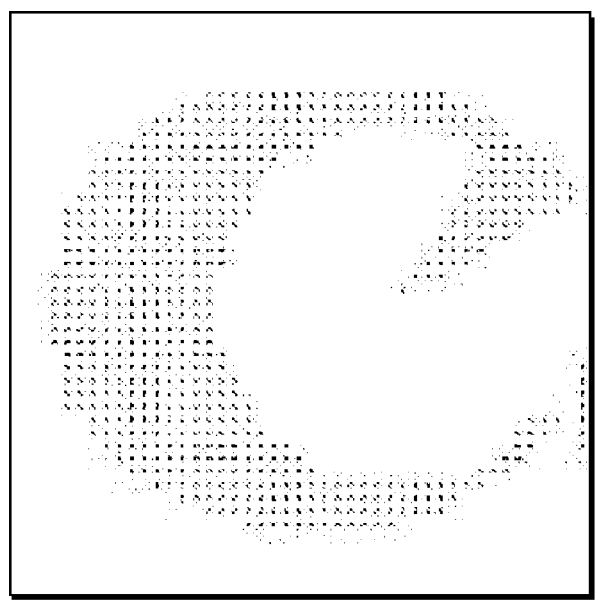
Figure 3:
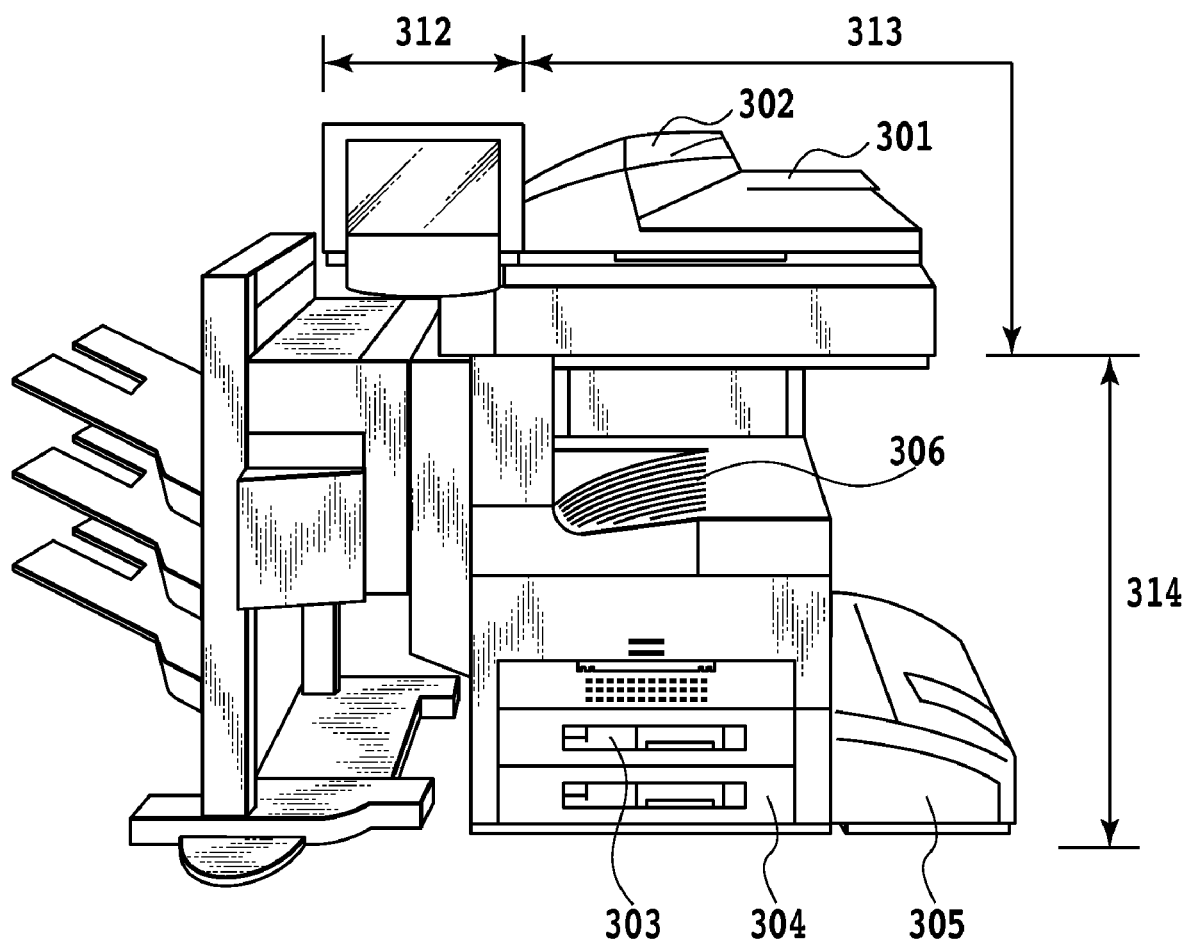
FIG. 3 is a view showing an appearance of an image forming apparatus.

FIG. 3 is a view showing an appearance of the image forming apparatus. A scanner unit 313 exposes and scans an image on a document to obtain reflected light. Then, the scanner unit 313 inputs the thus obtained reflected light into a light-sensitive element of a CCD (charge coupled device) or a CIS (contact image sensor), by which information on the image is converted to an electric signal. Further, the scanner unit 313 converts the electric signal to a luminance signal made up of colors of R, G, and B, thereby outputting the luminance signal as image data.

Documents are set on a tray 302 of a document feeder 301. When a user instructs an operation unit 312 to start reading, an instruction to read the documents is given to the scanner unit 313. Upon receipt of the instruction, the scanner unit 313 feeds the documents one by one from the tray 302 of the document feeder 301, thereby reading the documents. It is noted that a method for reading the documents is not an automatic feeding method by the document feeder 301 but may be a method in which the documents are placed on a glass surface (not illustrated) to perform the scanning of the documents by allowing an exposure portion to move.

A printer unit 314 is an image forming device which forms the image data on a sheet. In the present embodiment, an image forming method is to be an electro-photographic method using a photosensitive drum or a photosensitive belt. However, the present invention shall not be limited thereto. For example, an inkjet method for ejecting ink from a minute nozzle array to print an image on a sheet may be used in the present embodiment. Further, a plurality of sheet cassettes capable of selecting different sheet sizes or different sheet directions are provided at the printer unit 314. Specifically, the image forming apparatus shown in FIG. 3 is provided with a sheet cassette 1 (303), a sheet cassette 2 (304) and a sheet cassette 3 (305). Sheets after being printed are discharged on the sheet discharging tray 306.

<Description of Synthesis Processing of Copy-Forgery-Inhibited Pattern Image>

Next, a description will be given of the synthesis processing of a copy-forgery-inhibited pattern image with reference to FIG. 10. In the following description, a RAM is referred to as a RAM mounted on the image forming apparatus in FIG. 3 and a HDD is referred to as a HDD mounted on the image forming apparatus in FIG. 3. Further, the processing shown in FIG. 10 is performed by the CPU mounted on the image forming apparatus in FIG. 3.

The image forming apparatus in FIG. 3 is able to develop an image of characters and symbols specified by a setting for types of copy-forgery-inhibited pattern printing to be described later with reference to FIG. 7 as a bit map on the RAM mounted on the image forming apparatus.

Figure 10:
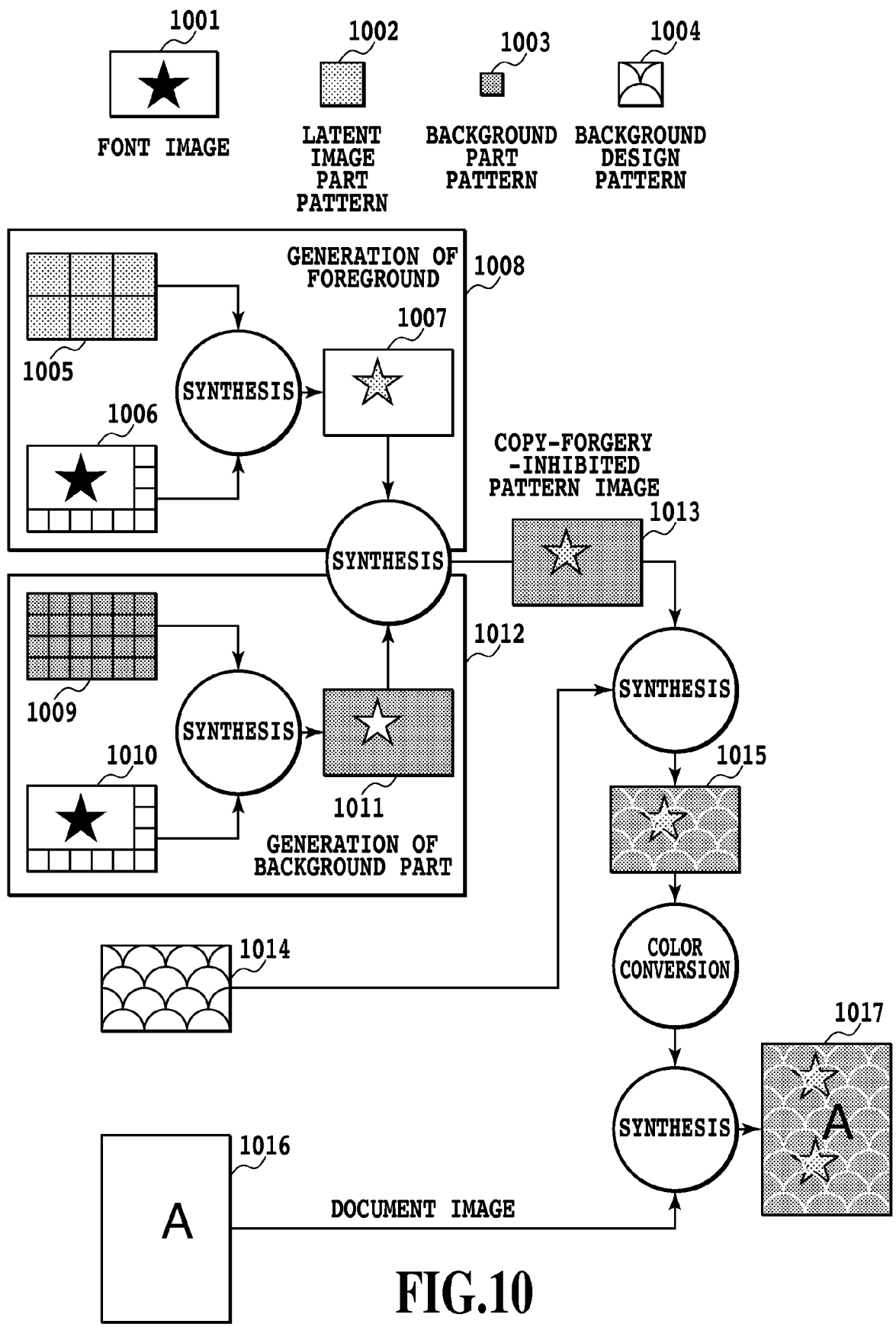
FIG. 10 is a view showing the processing of generating a copy-forgery-inhibited pattern image.

An image 1001 in FIG. 10 is an example in which a symbol of "★" is developed as a bit map. The image 1001 is an image which is selected where "copy prohibited" is set by a setting for types of copy-forgery-inhibited pattern printing on a screen shown in FIG. 7, for example.

Copy-forgery-inhibited patterns used in a major dot portion, a minor dot portion of a copy-forgery-inhibited pattern image and a background design as shown in the images 1002, 1003, 1004 are retained in the HDD and developed at any given size on the RAM.

Further, as a copy-forgery-inhibited pattern in the major dot portion and the minor dot portion of the copy-forgery-inhibited pattern image on the images 1002 and 1003, a copy-forgery-inhibited pattern corresponding to the densities determined by a user who has adjusted the densities of the major dot portion and the minor dot portion to be described later, by which images of copy-forgery-inhibited patterns corresponding to a plurality of densities are retained in the HDD.

A block 1008 shows the processing of image generation in the major dot portion of a copy-forgery-inhibited pattern.

An image 1005 contained in the block 1008 is obtained by repeating a major dot copy-forgery-inhibited pattern stored in the HDD corresponding to densities set by a user at the time of adjustment of the density of the major dot portion in a predetermined number of times and developing it on the RAM.

An image 1006 contained in the block 1008 is obtained by developing a specified font (character) on the RAM. In order to adjust to the image 1005 in the image size, white images are added to the periphery of the image 1006. After generation of the image 1005 and the image 1006 on the RAM, both of the images are subjected to synthesis processing, by which an image 1007 of the major dot portion is generated on the RAM. At this time, the synthesis processing is performed so that the copy-forgery-inhibited pattern of the image 1005 can remain only at a part of the font (character portion) of the image 1006.

A block 1012 shows the processing of generating an image of the minor dot portion in the copy-forgery-inhibited pattern.

An image 1009 contained in the block 1012 is obtained by repeating a background copy-forgery-inhibited pattern stored in the HDD corresponding to densities set by a user at the time of adjustment of the density of the minor dot portion in a predetermined number of times and developing it on a memory.

An image 1010 contained in the block 1012 is obtained by developing a specified font (character portion) on the RAM. In order to adjust the image size to the image 1009, white images are added to the periphery of the image 1010. After generation of the image 1009 and the image 1010 on the RAM, both of the images are subjected to synthesis processing, by which an image 1011 at the minor dot portion is generated on the RAM. At this time, the synthesis processing is performed so that the copy-forgery-inhibited pattern of the image 1009 can remain only at a part other than the font (character portion) of the image 1010.

An image 1014 is a background design image and obtained by developing the image 1004 having a background design copy-forgery-inhibited pattern on the RAM. The image 1014 is not generated where the background design 801 is set to be "not found" in a detailed setting for copy-forgery-inhibited pattern printing on the screen shown in FIG. 8.

After the image generation processing is completed by the block 1008 and the block 1012, the image 1007 at the major dot portion and the image 1011 at the minor dot portion are subjected to synthesis processing, thereby forming an image 1013 on the RAM.

Where an instruction to form a background design image of the image 1014 is given, the image 1013 is further subjected to the synthesis processing thereby generating the image 1015 on the RAM. At this time, the synthesis is performed so that the background design image is made to be outlined character, thereby forming an image 1015 which is a copy-forgery-inhibited pattern image.

Figure 8:
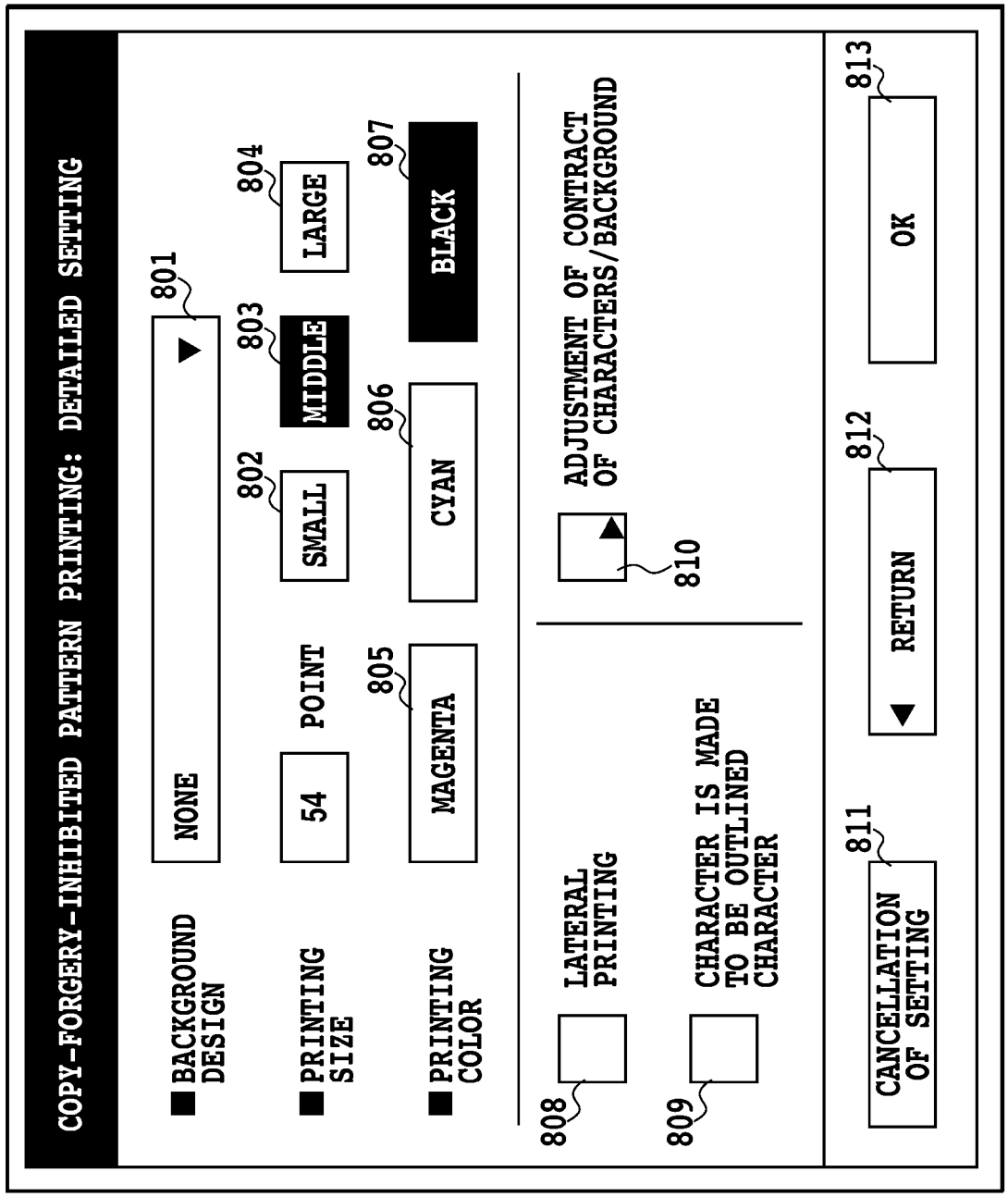
FIG. 8 is a view showing a screen of the user interface of the image forming apparatus.

The copy-forgery-inhibited pattern image 1015 is converted in color which is specified by the detailed setting for copy-forgery-inhibited pattern printing shown in FIG. 8 and, thereafter, synthesized with a document image 1016. Thereby, an image 1017, which is a copy-forgery-inhibited pattern image, is generated on the RAM.

<Description of Printing Processing of Copy-Forgery-Inhibited Pattern Image>

Figure 4:
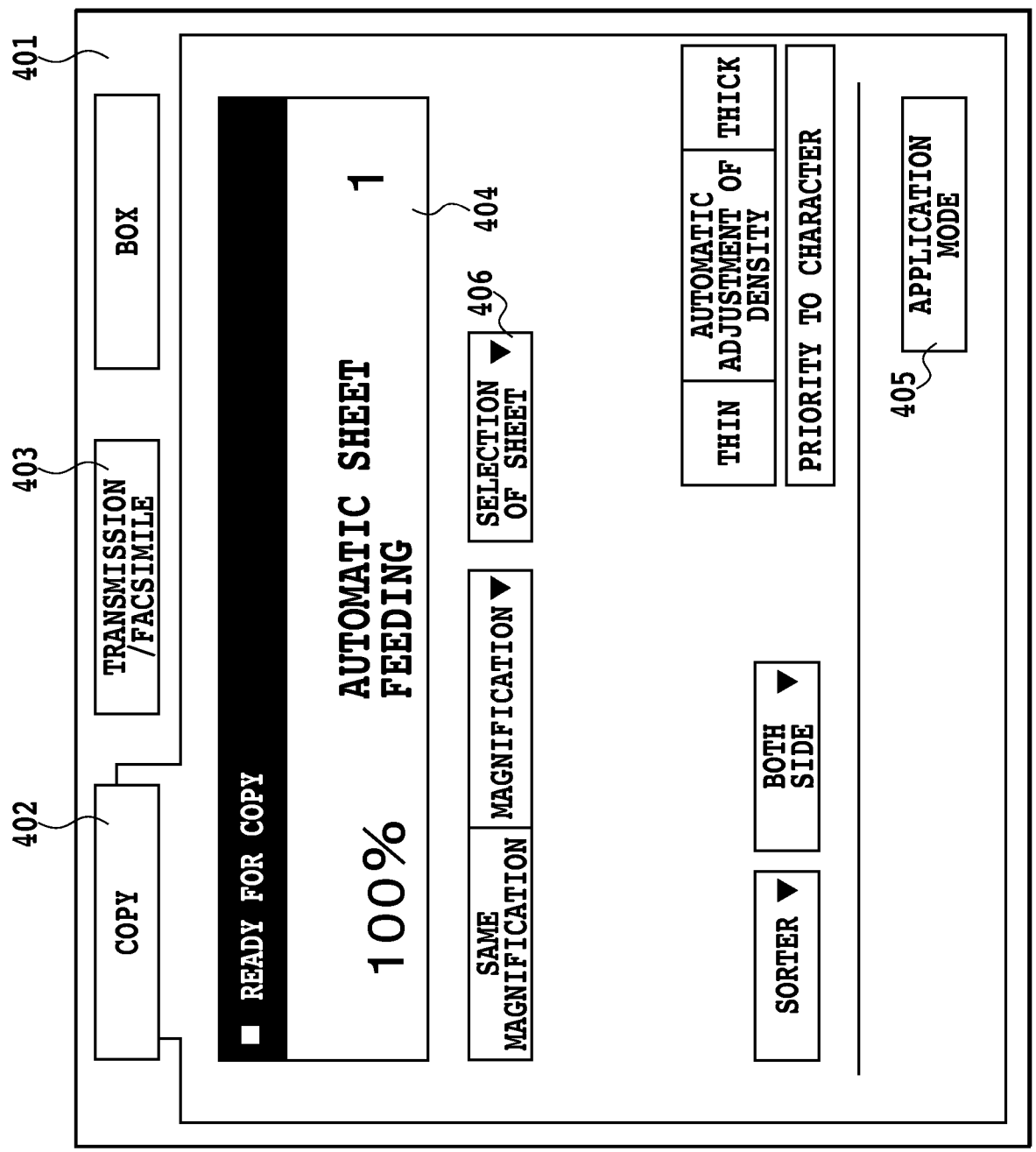
FIG. 4 is a view showing a screen of the user interface of the image forming apparatus.

FIG. 4 shows a user interface which shows an ordinary copy screen of an image forming apparatus. The user interface shown in FIG. 4 is displayed at an operation unit 312 in FIG. 3. In FIG. 4, a screen 401 is a screen of the user interface. Further, in FIG. 4, a copy tab 402 is a tab for selecting copy. Still further, in FIG. 4, a transmission/facsimile tab 403 is a tab for selecting functions of transmission and facsimile.

In the present embodiment, a description will be hereinafter given of only a case where depression of the copy tab 402 is allowed. A description of the other tabs is not important and omitted here.

In FIG. 4, a state display window 404 is to display the setting of copy. Further, in FIG. 4, an application mode button 405 is a button for making a more detailed copy setting. Copy-forgery-inhibited pattern printing and adjustment of copy-forgery-inhibited pattern densities are set by depressing the application mode button 405. A button 406 is a button for selecting sheets to be printed.

Figure 5:
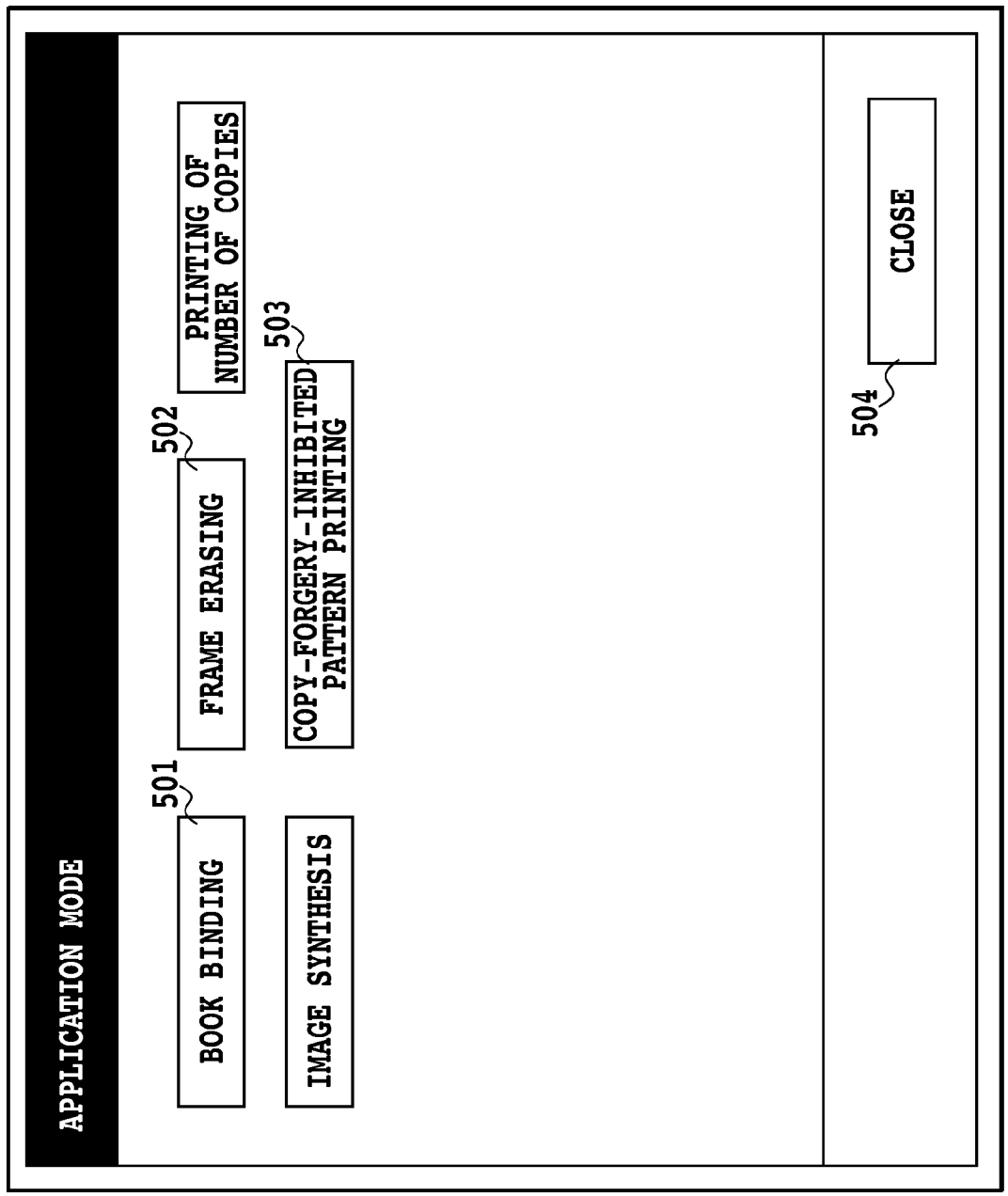
FIG. 5 is a view showing a screen of the user interface of the image forming apparatus.

FIG. 5 shows a screen of the user interface which shows an application mode setting screen displayed on the operation unit 312 in FIG. 3 when the application mode button 405 in FIG. 4 is depressed.

On the application mode setting screen in FIG. 5, a setting button 501 for book-binding printing, a setting button 502 for frame erasing printing, and a setting button 503 for copy-forgery-inhibited pattern printing are provided. Motions when the setting button 503 for copy-forgery-inhibited pattern printing is depressed will be described later.

Figure 11:
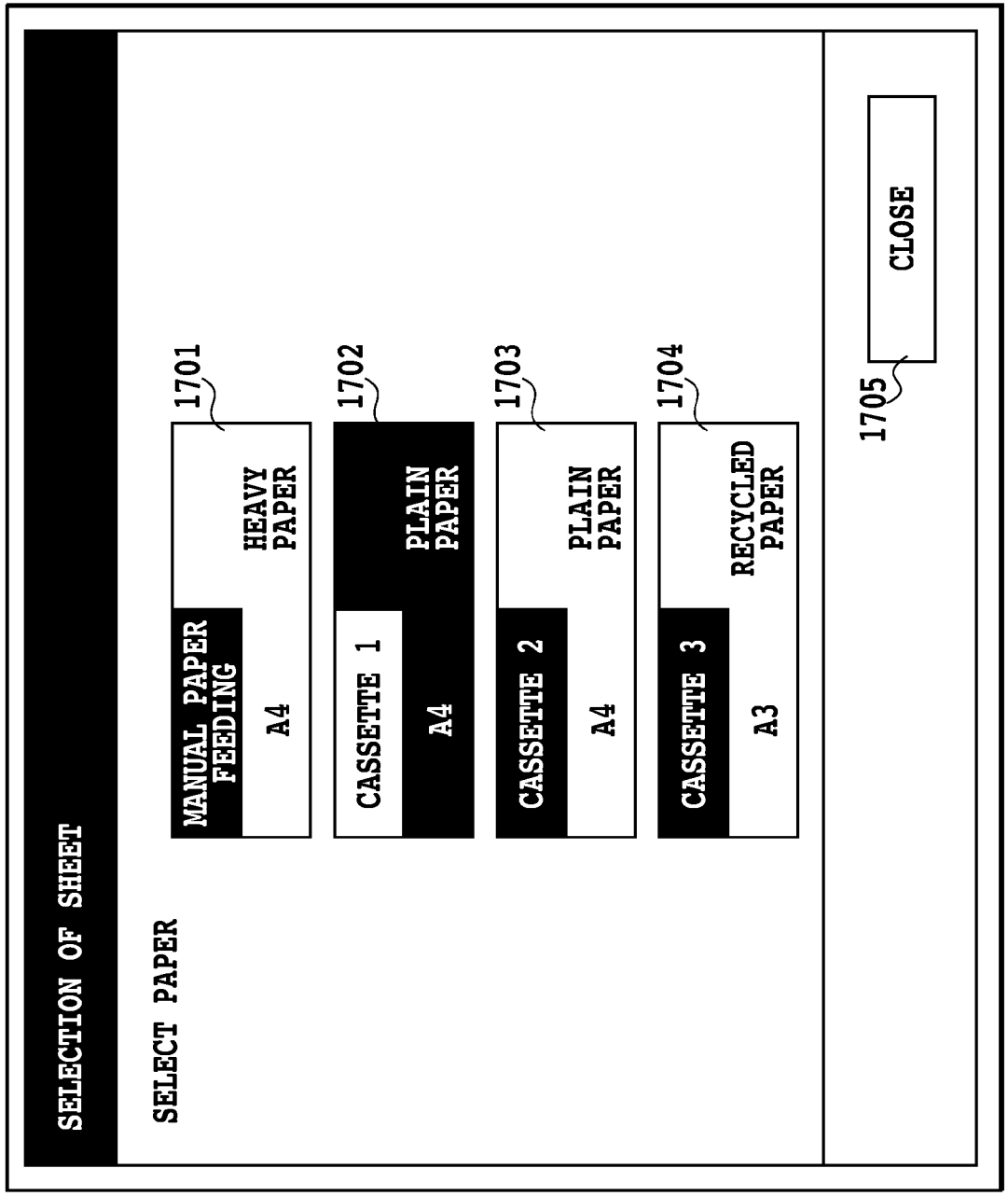
FIG. 11 is a view showing a screen of the user interface of the image forming apparatus.

FIG. 11 is the user interface which shows a sheet selection screen displayed on the operation unit 312 where the sheet selection button 406 in FIG. 4 is depressed. On the sheet selection screen in FIG. 11, a button 1701 for using sheets set on a manual sheet feeding tray (not illustrated in FIG. 3) on printing is provided. Further, on the sheet selection screen in FIG. 11, a button 1702 for selecting sheets set on a sheet cassette 1 (303) in FIG. 3 on printing is provided. Still further, on the sheet selection screen in FIG. 11, a button 1703 for selecting sheets set on a sheet cassette 2 (304) in FIG. 3 on printing is provided. In addition, on the sheet selection screen in FIG. 11, a button 1704 for selecting sheets set on a sheet cassette 3 (305) in FIG. 3 on printing is provided.

Next, a description will be given of setting procedures and processing for printing a copy-forgery-inhibited pattern image and the setting content-specific warning display which is characteristic processing of the present embodiment with reference to the flowchart of copy motions shown in FIG. 9 and the display screen of the operation unit 312 shown in FIG. 4 to FIG. 8, FIG. 11 and FIG. 13.

Figure 9:
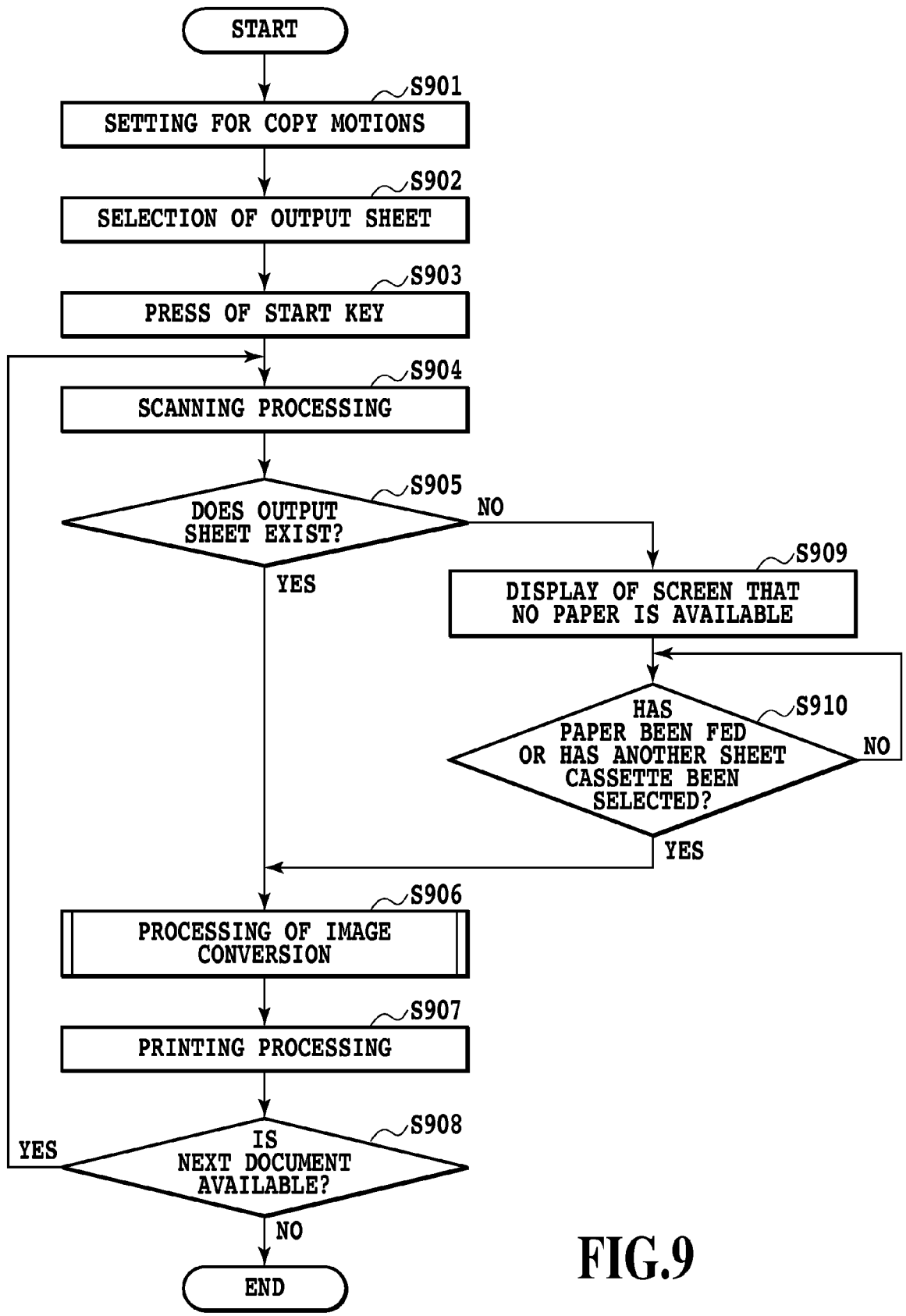
FIG. 9 is a flowchart which shows the processing of copy motions.

The processing to be described hereinafter and shown in the flowchart in FIG. 9 is executed by a CPU mounted on the image forming apparatus in FIG. 3.

First, in order to select copy-forgery-inhibited pattern printing as a setting for copy motions in Step S901 in FIG. 9, the press of the application mode setting button 405 on the screen 401 in FIG. 4 displayed on the operation unit 312 in FIG. 3 is allowed.

Then, the application mode setting screen in FIG. 5 is displayed and the press of the button 503 in FIG. 5 is accepted, by which copy-forgery-inhibited pattern printing is selected.

Figure 6:
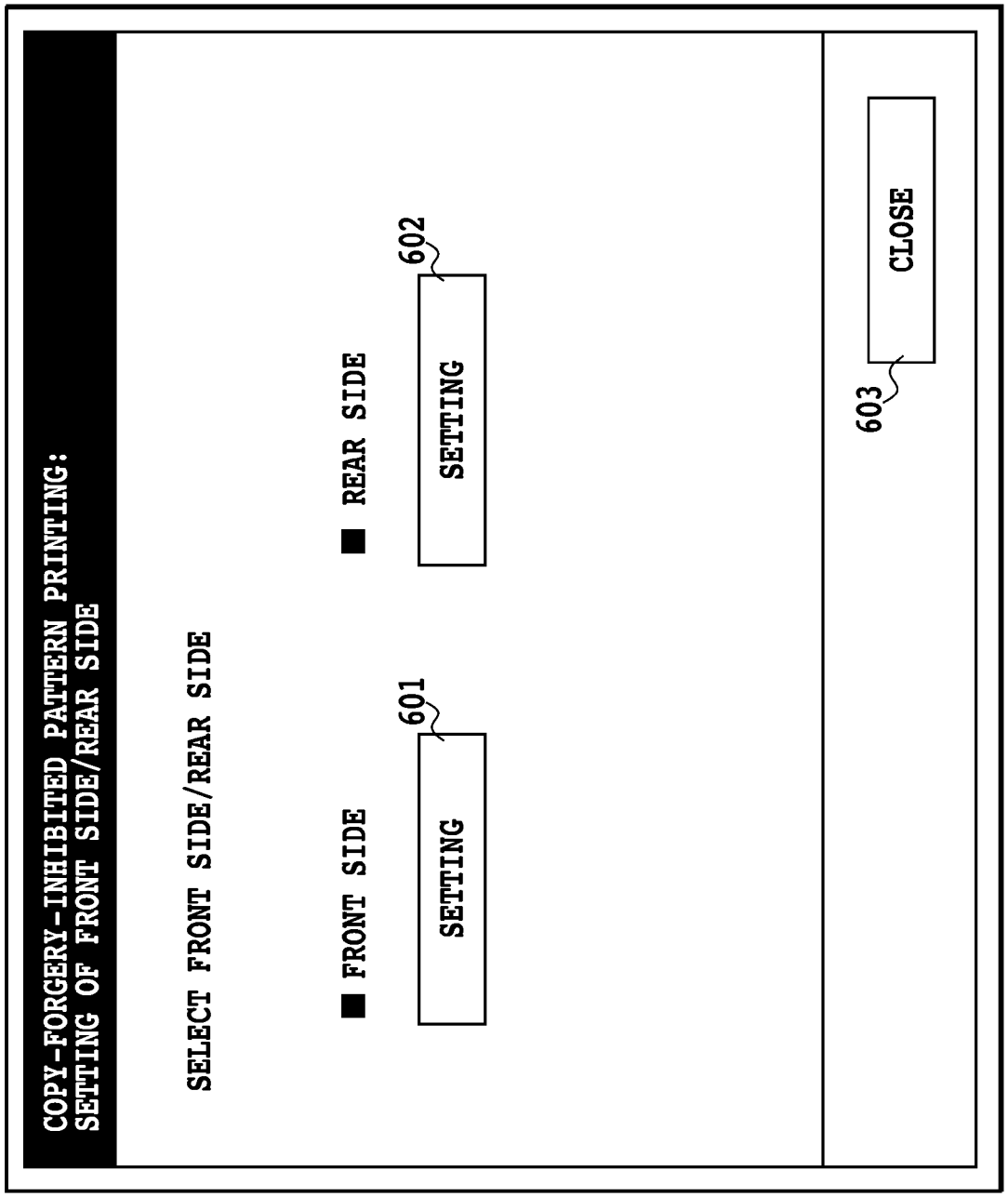
FIG. 6 is a view showing a screen of the user interface of the image forming apparatus.

Specifically, when the press of the button 503 is accepted, a screen is displayed for selecting the respective settings for copy-forgery-inhibited patterns on the front side and the rear side shown in FIG. 6.

In order to set the copy-forgery-inhibited pattern on the front side on the screen in FIG. 6, the button 601 is depressed. And in order to set the copy-forgery-inhibited pattern on the rear side, the button 602 is depressed. In such a case, as one example, the copy-forgery-inhibited pattern on the front side is set first and the press of the button 601 is accepted.

Figure 7:
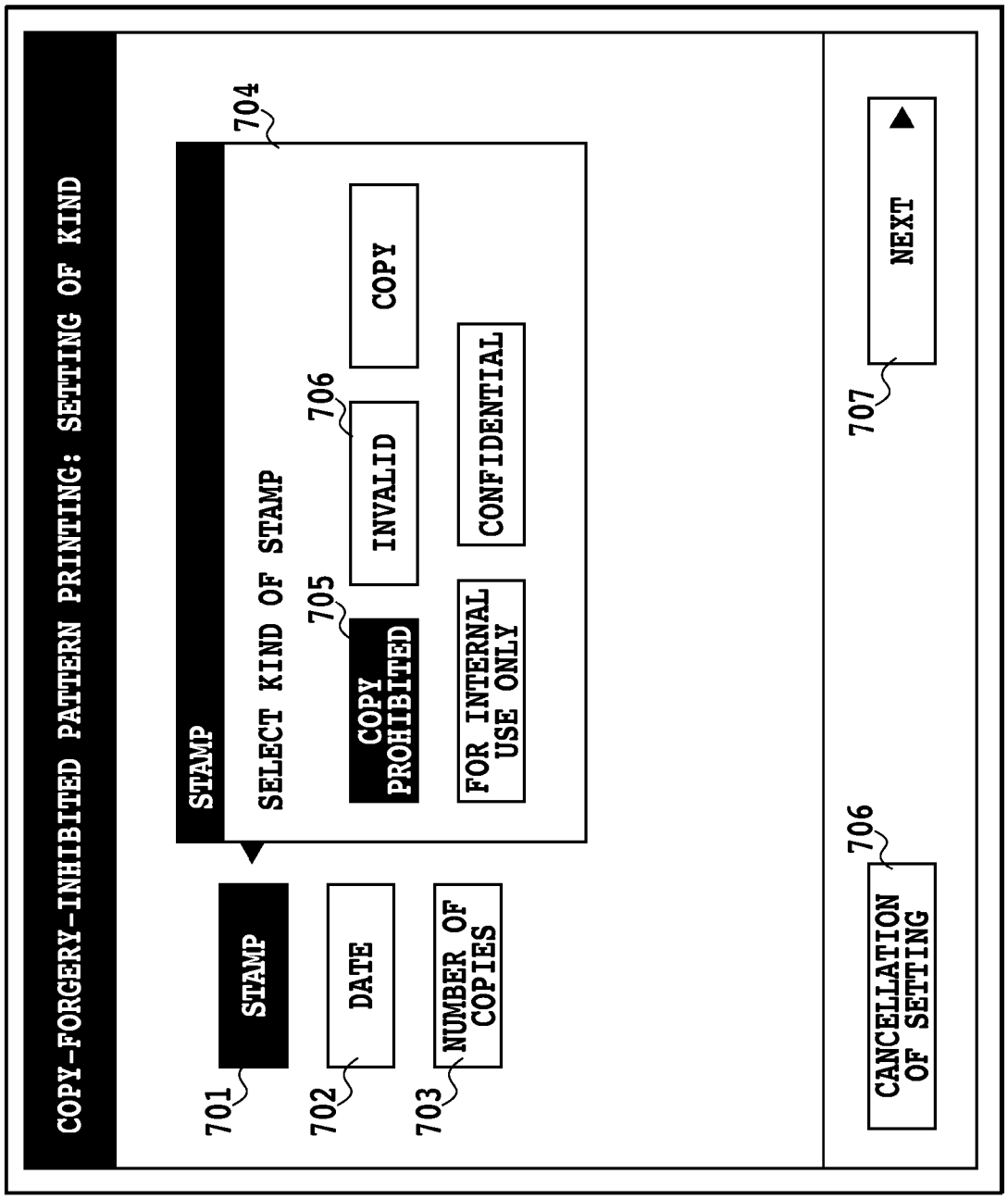
FIG. 7 is a view showing a screen of the user interface of the image forming apparatus.

When the press of the button 601 is accepted, as shown in FIG. 7, a screen is displayed for selecting prints of copy-forgery-inhibited patterns to be printed.

In order to print the stamp on the screen in FIG. 7, the button 701 is depressed, in order to print the date, the button 702 is depressed, and in order to print the number of copies, the button 703 is depressed.

FIG. 7 shows a screen where press of the button 701 is accepted, as one example.

When the press of the button 701 is accepted, a list 704 for selecting the kind of stamp to be printed is displayed.

One setting is selected as a kind of stamp among "COPY PROHIBITED (705)," "NOEFFECT (706)," "COPY," "INTERNALUSEONLY" and "CONFIDENTIAL" displayed on the list 704.

In such a case, FIG. 7 shows a screen where "COPY PROHIBITED (705)" is selected as one example.

Where the press of a setting cancellation button 706 is accepted on the screen in FIG. 7, the selection of copy-forgery-inhibited pattern printing is cancelled and the processing returns to the application mode selection screen in FIG. 5.

Further, where the press of a button 707 of "NEXT" is accepted on the screen in FIG. 7, a detailed setting screen in FIG. 8 is displayed, thus making it possible to make a more detailed setting.

In FIG. 8, a button 801 is to select a background design.

When the press of the button 801 is accepted, it is possible to select a design to be printed at the same time, in addition to a copy-forgery-inhibited pattern selected on the screen in FIG. 7 (for example, "COPY PROHIBITED (705)").

Designs such as "FAN," "STAR" and "CHERRY BLOSSOM" are set as designs to be printed.

Further, the press of the buttons 802 to 804 in FIG. 8 is accepted, thereby setting the printing size of a copy-forgery-inhibited pattern.

On the screen in FIG. 8, "MODERATE (54 points)" is selected as one example.

Further, the buttons 805 to 807 in FIG. 8 are depressed, by which one color to be printed (for example, "BLACK") is selected among magenta, cyan and black.

Further, the button 808 in FIG. 8 is a button for printing a copy-forgery-inhibited pattern, with the printing thereof directed laterally to output sheets.

Further, the button 809 in FIG. 8 is a button for allowing the copy-forgery-inhibited pattern printed on the sheet to be made to be outlined character on printing and being struck up.

Still further, the button 810 in FIG. 8 is a button for adjusting the contrast between a character (copy-forgery-inhibited pattern) and a background. The button 810 is depressed, by which the screen is shifted to a screen on which a major dot portion and a minor dot portion are adjusted for densities.

In addition, the button 812 in FIG. 8 is a button for returning the screen back to one previous screen. Specifically, when the press of the button 812 is accepted, the screen returns to the screen for selecting a type of copy-forgery-inhibited pattern in FIG. 7.

Where all settings for the front side are completed, the press of an OK button 813 is accepted and the screen returns to the screen in FIG. 6.

Here, assuming that, on the screen in FIG. 6, copy-forgery-inhibited pattern printing on the rear side is set similarly as that on the front side, as one example, the press of the button 603 is accepted. As described above, the press of the button 603 is accepted, by which the copy-forgery-inhibited pattern printing is set completely.

Hereinafter, a description will be given of the warning screen shown in FIG. 13.

The warning screen shown in FIG. 13 is displayed, depending on the setting for copy-forgery-inhibited pattern printing on the front side or that on the rear side.

Figure 16:
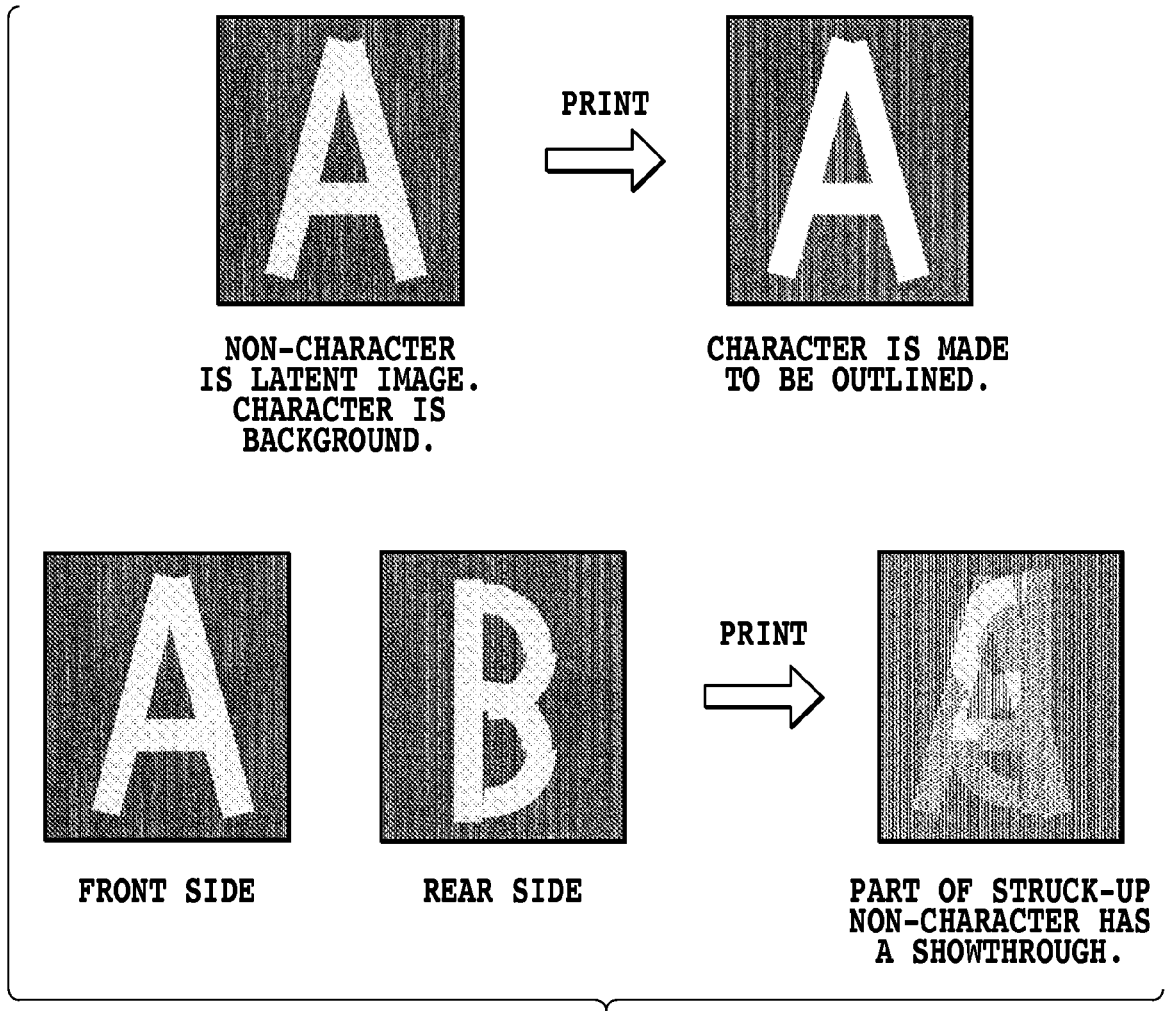
FIG. 16 is a view showing a defect due to showthrough in a case where the character portion of the copy-forgery-inhibited pattern image is made to be outlined character on printing of both sides.
Figure 17:
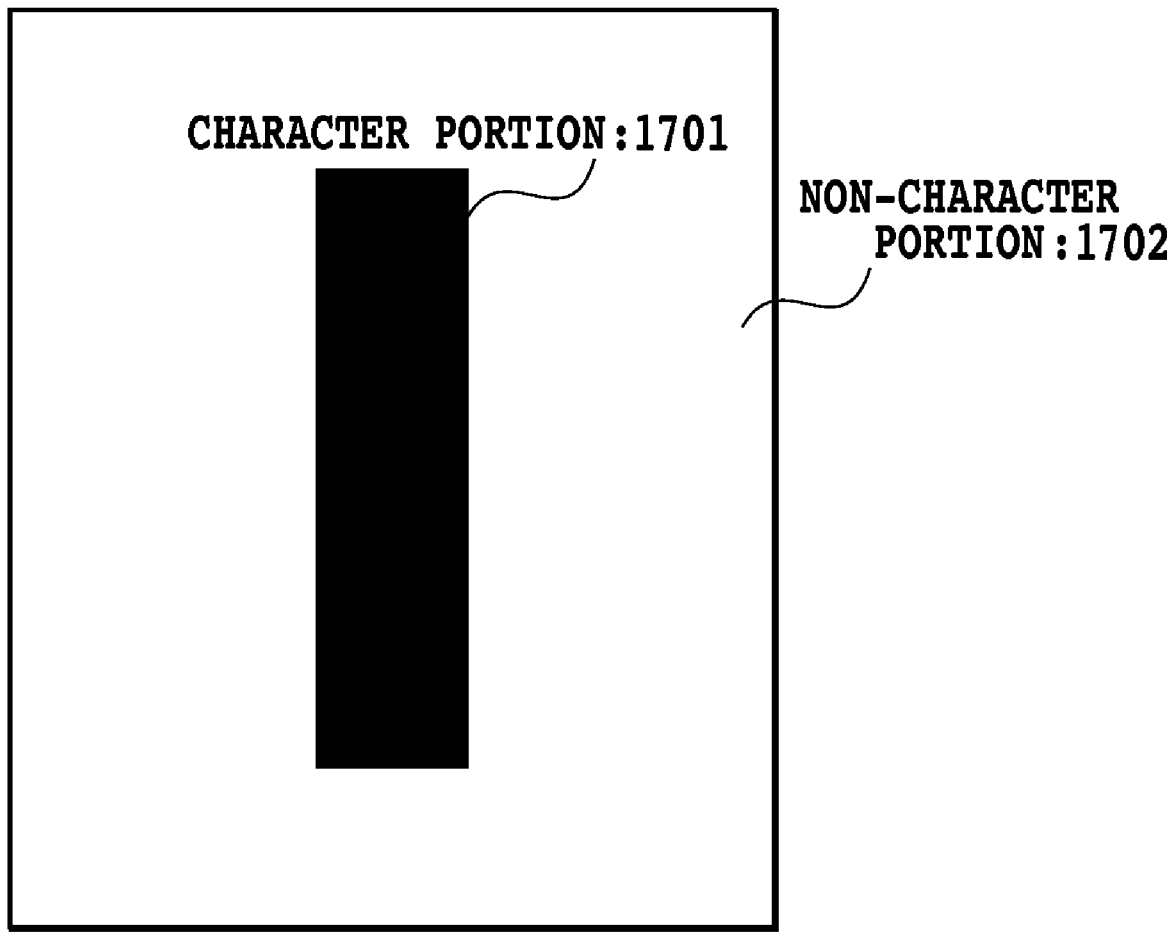
FIG. 17 is a view showing a character portion and a non-character portion of the copy-forgery-inhibited pattern.

Specifically, where in both the setting for copy-forgery-inhibited pattern printing on the front side and the setting for copy-forgery-inhibited pattern printing on the rear side, the button 809 on the screen in FIG. 8 is depressed to make such a setting that "a character is made to be outlined character and a character portion is rendered to a minor dot portion," the processing described below will be executed. Specifically, subsequent processing is temporarily halted and the CPU effects control so as to display the warning screen in FIG. 13. Since there is a possibility that the defect shown in FIG. 16 (FIG. 18) may occur, the warning screen in FIG. 13 is displayed, thereby encouraging a user to change the setting. By the warning screen in FIG. 13, the occurrence of the defect described later can be prevented.

Where the press of a continuation button 2001 is accepted on the warning screen in FIG. 13, it is understood that a possibility of defect occurrence is allowed by a user. Therefore, the printing is made, while a setting for copy-forgery-inhibited pattern printing on the front side and on the rear side are kept as the setting "a character is made to be outlined character."

Figure 18:
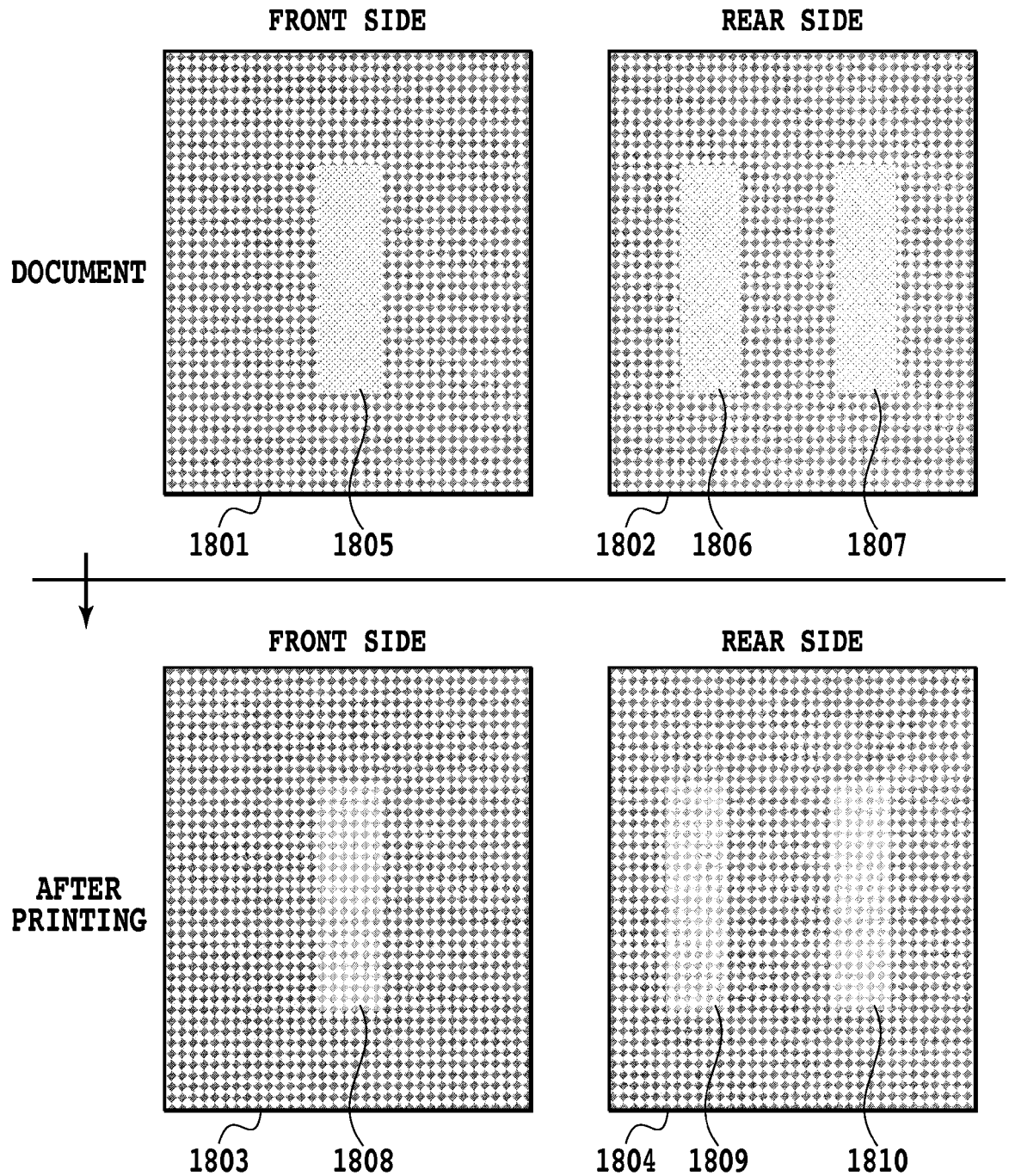
FIG. 18 is a view showing a case where the character portion of the copy-forgery-inhibited pattern image is set on printing of both sides so that the front side is made to be outlined character and the rear side is also made to be outlined character.
Figure 19:
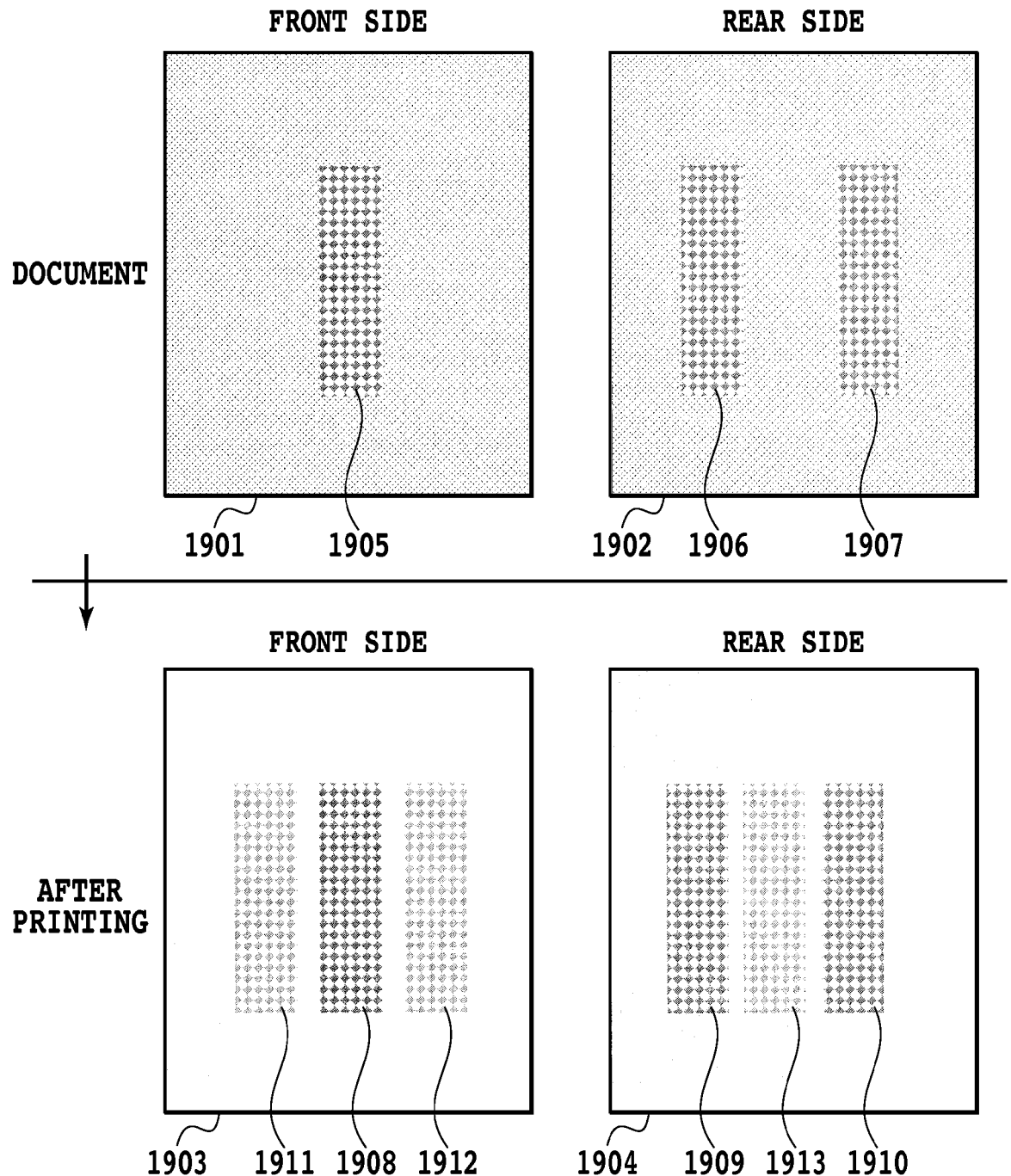
FIG. 19 is a view showing a case where the character portion of the copy-forgery-inhibited pattern image is set on printing of both sides so that the front side is a latent image and the rear side is also a latent image.

On the other hand, where the press of a return button 2002 is accepted on the warning screen in FIG. 13, the screen returns to the screen in FIG. 6, by which it is possible to set again a copy-forgery-inhibited pattern on the front side or on the rear side. Where resetting, at least an instruction to cancel the setting for "a character is made to be outlined character" from the settings for copy-forgery-inhibited pattern on the front side and that on the rear side is given by a user, it is possible to cancel at least one of these two settings. As a result, it is possible to prevent the defect shown in FIG. 16 (FIG. 18).

Upon completion of the setting for copy-forgery-inhibited pattern printing in Step S901 in FIG. 9 as described above, then, output sheet selection is executed in Step S902. In the processing of the output sheet selection, when the press of the sheet selection button 406 in FIG. 4 is accepted, the sheet selection screen in FIG. 11 is displayed. As described above, the buttons 1701 to 1704 are depressed, by which the sheet to be printed is selected. Here, as one example, the press of the button 1702 is accepted, by which a sheet on the sheet cassette 1 is to be selected as the sheet to be printed.

Next, in Step S903, the press of a start key at the operation unit 312 of the image forming apparatus shown in FIG. 3 is accepted, reading of documents is started.

Then, in Step S904, one sheet of documents set in advance on the tray 302 of the document feeder 301 in FIG. 3 is fed, and the document is subjected to scanning processing and converted to image data.

Next, in Step S905, a determination is made for whether there exist output sheets selected in Step S902.

Where a determination is made that the thus selected output sheets exist in Step S905, the processing proceeds to Step S906.

On the other hand, where a determination is made in Step S905 that the thus selected output sheets do not exist, the processing proceeds to Step S909.

In Step S909, it is displayed at the operation unit 312 in FIG. 3 that the output sheets selected in Step S902 do not exist, by which a user of the image forming apparatus in FIG. 3 is urged to feed sheets or select output sheets of another sheet cassette.

Next, in Step S910, a determination is made for whether the output sheets selected in Step S902 have been fed or the output sheets of another sheet cassette have been selected.

Where a determination is made in Step S910 that the output sheets selected in Step S902 have been fed or the output sheets of another sheet cassette have been selected, the processing proceeds to Step S906.

On the other hand, where a determination is made in Step S910 that the output sheets selected in Step S902 have been fed or the output sheets of another sheet cassette have not been selected, the processing of Step S910 is repeated.

In Step S906, the image data obtained by the scanning processing executed in Step S904 is subjected to conversion of image data according to the setting made in Step S901. In the present embodiment, since copy-forgery-inhibited pattern printing has been set in Step S901, the image data is subjected to the synthesis processing of a copy-forgery-inhibited pattern image. Details of the synthesis processing of the copy-forgery-inhibited pattern image will be performed as described with reference to FIG. 10.

Next, in Step S907, printing processing is performed in which the image data generated in Step S906 is printed on the sheets.

Next, a determination is made in Step S908 for whether a next document exists on the tray 302 of the document feeder 301.

Where a determination is made in Step S908 that the next document exists, the processing returns to Step S904.

Where a determination is made in Step S908 that the next document does not exist, the processing ends.

In the present embodiment, where the press of the continuation button 2001 is accepted on the warning screen in FIG. 13, it is understood that a possibility of defect occurrence is allowed and the printing is made, while a setting for copy-forgery-inhibited pattern printing on the front side and a setting for copy-forgery-inhibited pattern printing on the rear side have been made as the setting of "a character is made to be outlined character." However, this setting will be hardly allowed for users. Therefore, the above-described warning screen is displayed, by which it is practically prohibited that the printing is made, while a setting for copy-forgery-inhibited pattern printing on the front side and a setting for copy-forgery-inhibited pattern printing on the rear side are made as the setting of "a character is made to be outlined character."

Second Embodiment

In the first embodiment, the warning display is performed on the warning screen in FIG. 13, where the setting for copy-forgery-inhibited pattern printing on the front side and the setting for copy-forgery-inhibited pattern printing on the rear side have been made as the setting of "a character is made to be outlined character." Then, a user is able to change the setting for copy-forgery-inhibited pattern printing appropriately with reference to the warning display.

In such a case, in order to improve the usability of users, when the setting of "a character is made to be outlined character" is made in the setting for copy-forgery-inhibited pattern printing on one side to be printed, the setting of "a character is made to be outlined character" is not allowed on the other side to be printed.

Therefore, in the second embodiment, when the setting of "a character is made to be outlined character" is made in the setting for copy-forgery-inhibited pattern printing on one side to be printed, the setting for copy-forgery-inhibited pattern printing on the one side to be printed is prohibited in accordance with the content of the setting for copy-forgery-inhibited pattern printing on the other side to be printed.

In the first embodiment, a description was given of the copy motions with reference to FIG. 9 and also of the display screen of the operation unit 312 with reference to FIG. 4 to FIG. 8, FIG. 11 and FIG. 13.

In the present embodiment, the warning display screen shown in FIG. 13 is not displayed. Instead, displayed is a screen for the detailed setting for copy-forgery-inhibited pattern printing shown in FIG. 8 and FIG. 12.

Thereby, where the setting for copy-forgery-inhibited pattern printing on the other side to be printed is made in accordance with the content of the setting for copy-forgery-inhibited pattern printing on one side to be printed, the screen is displayed whether the setting of "a character is made to be outlined character" can be made.

Figure 12:
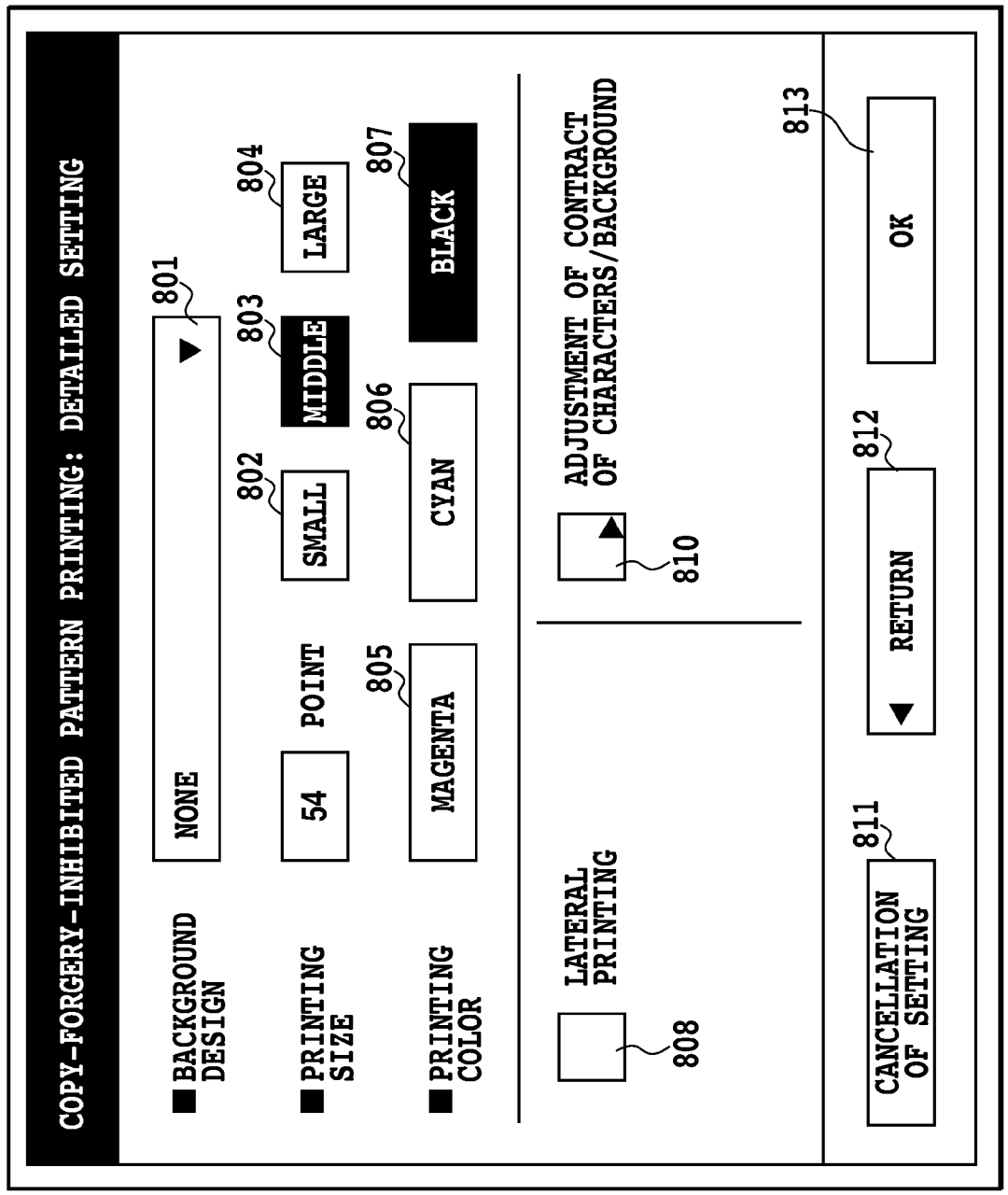
FIG. 12 is a view showing a screen of the user interface of the image forming apparatus.
Figure 14:
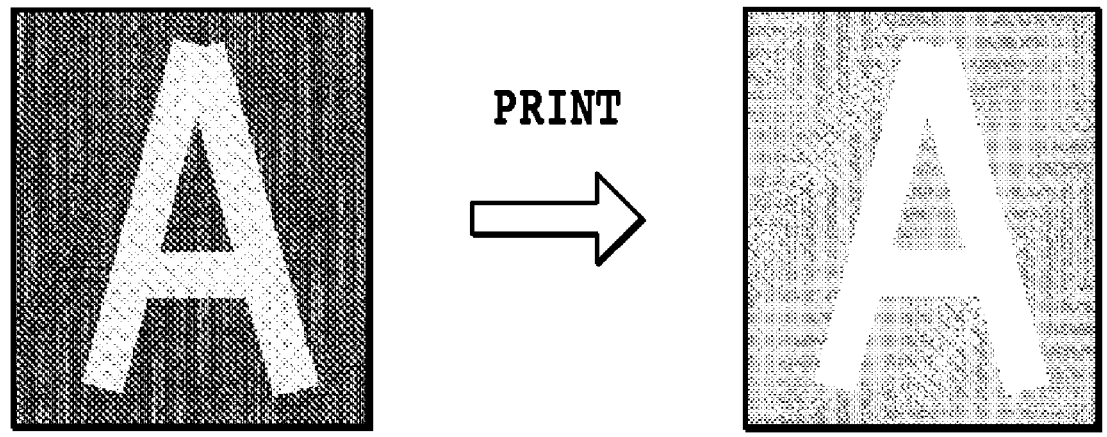
FIG. 14 is a view showing that a character portion of a copy-forgery-inhibited pattern image is made to be outlined character on printing.
Figure 15:
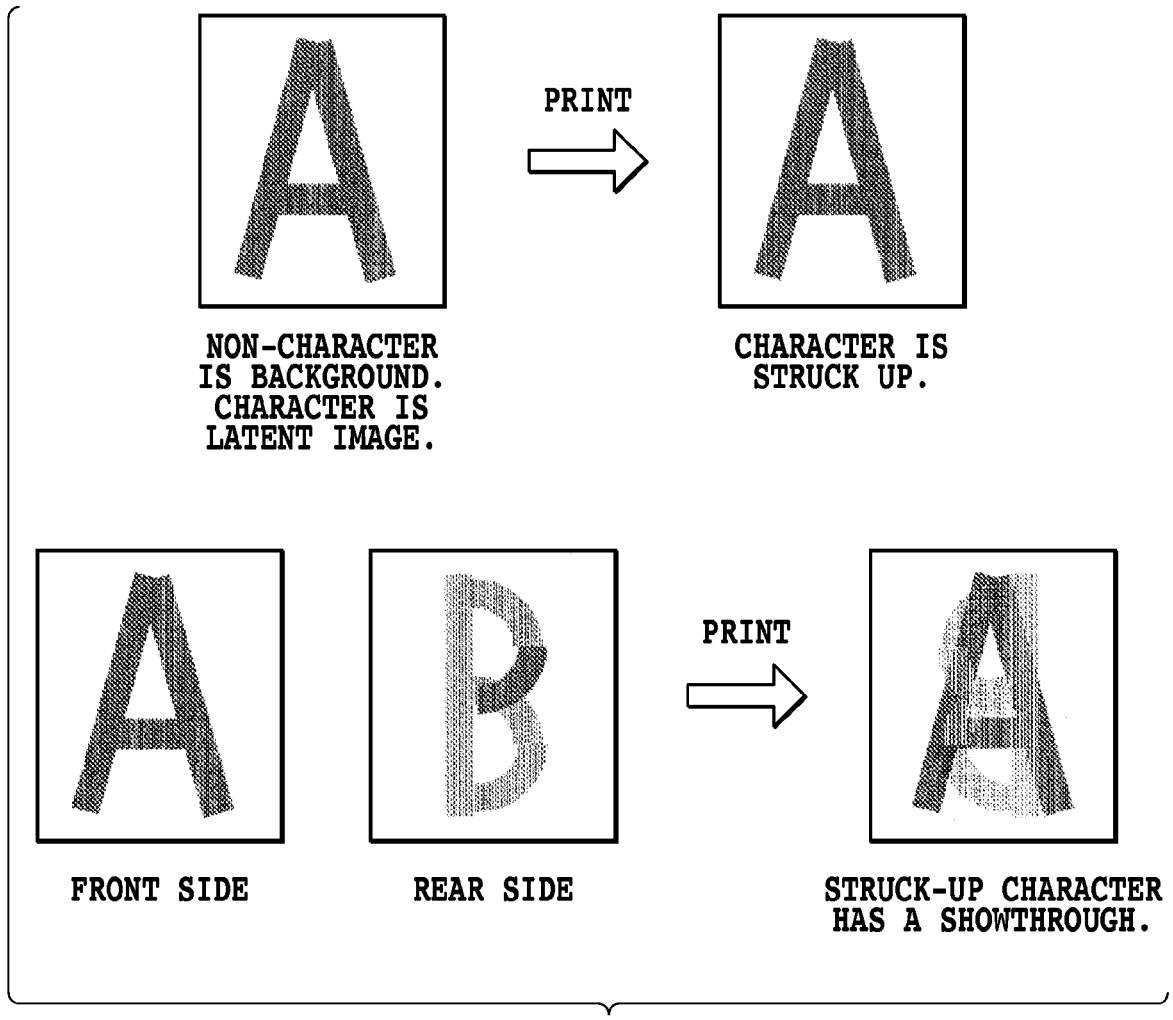
FIG. 15 is a view showing a case where the character portion of the copy-forgery-inhibited pattern image is visualized on printing of both sides.

The screen in FIG. 8 is different from FIG. 12 in that a button for making the setting of "a character is made to be outlined character" as shown by the button 809 is provided on the screen in FIG. 8, while a button corresponding thereto is provided on the screen in FIG. 12.

Specifically, where the setting of "a character is made to be outlined character" is made in the setting for copy-forgery-inhibited pattern printing on the front side, in an attempt to make a detailed setting for copy-forgery-inhibited pattern printing by the same procedures as the setting for copy-forgery-inhibited pattern printing on the rear side, the setting screen in FIG. 12, which will be described later, is displayed. Specifically, no item of making the setting of "a character is made to be outlined character" is provided on the screen in FIG. 12. The setting for copy-forgery-inhibited pattern printing on the rear side is made so that the setting of "a character is made to be outlined character" is allowed. In other words, where a copy-forgery-inhibited pattern image in which a character portion is rendered to a minor dot portion is printed on one side of a sheet, it is prohibited that the copy-forgery-inhibited pattern image in which the character portion is rendered to the minor dot portion is printed on the other side of the sheet.

On the other hand, where the setting of "a character is made to be outlined character" is not made in the setting for copy-forgery-inhibited pattern printing on the front side, the screen in FIG. 8 is displayed, and the setting of "a character is made to be outlined character" can be made in the setting for copy-forgery-inhibited pattern printing on the rear side. In other words, where such a setting is not made that a copy-forgery-inhibited pattern image in which a character portion is rendered to a minor dot portion is printed on one side of a sheet, it is allowed that the copy-forgery-inhibited pattern image in which the character portion is rendered to the minor dot portion is printed on the other side of the sheet.

Further, where the setting of "a character is made to be outlined character" has been made in the setting for copy-forgery-inhibited pattern printing on the rear side prior to the setting for copy-forgery-inhibited pattern printing on the front side, in an attempt to make a detailed setting for copy-forgery-inhibited pattern printing by the same procedures as those for setting copy-forgery-inhibited pattern printing on the front side, the setting screen in FIG. 12 is similarly displayed. Specifically, no item of making the setting of "a character is made to be outlined character" is provided on the screen in FIG. 12, and the setting of "a character is made to be outlined character" cannot be made in the setting for copy-forgery-inhibited pattern printing on the front side. In other words, where such a setting is made that a copy-forgery-inhibited pattern image in which a character portion is rendered to a minor dot portion is printed on one side of a sheet, it is prohibited that the copy-forgery-inhibited pattern image in which the character portion is rendered to the minor dot portion is printed on the other side of the sheet.

On the other hand, the setting of "a character is made to be outlined character" has not been made in the setting for copy-forgery-inhibited pattern printing on the rear side prior to the setting for copy-forgery-inhibited pattern printing on the front side, the screen in FIG. 8 is displayed. The setting of "a character is made to be outlined character" can be made in the setting for copy-forgery-inhibited pattern printing on the front side. In other words, where such a setting is not made that a copy-forgery-inhibited pattern image in which a character portion is rendered to a minor dot portion is printed on one side of a sheet, it is allowed that the copy-forgery-inhibited pattern image in which the character portion is rendered to the minor dot portion is printed on the other side of the sheet.

As described above, it is possible to prevent that the setting of "a character is made to be outlined character" is made both in the setting for copy-forgery-inhibited pattern printing on the front side and in the setting for copy-forgery-inhibited pattern printing on the rear side. It is also possible to prevent the defect shown in FIG. 16.

Third Embodiment

In the first embodiment, when the setting of "a character is made to be outlined character" is made both in the setting for copy-forgery-inhibited pattern printing on the front side and in the setting for copy-forgery-inhibited pattern printing on the rear side, the warning display is provided. Further, in the second embodiment, when the setting of "a character is made to be outlined character" is made in the setting for copy-forgery-inhibited pattern printing on one side to be printed, it is prohibited that the setting of "a character is made to be outlined character" is made in the setting for copy-forgery-inhibited pattern printing on the other side to be printed.

In such a case, in order to improve the usability of users, when the setting of "a character is made to be outlined character" is made in the setting for copy-forgery-inhibited pattern printing on the other side to be printed, the setting may be switched automatically depending on the content of the setting for copy-forgery-inhibited pattern printing on the other side to be printed.

Therefore, in the third embodiment, when the setting of "a character is made to be outlined character" is made in the setting for copy-forgery-inhibited pattern printing on one side to be printed, the setting for copy-forgery-inhibited pattern printing on the other side to be printed is made automatically depending on the content of the setting for the copy-forgery-inhibited pattern printing on the other side to be printed.

A description has been given of the first embodiment, specifically, the copy motions with reference to FIG. 9 and the display screen of the operation unit 312 with reference to FIG. 4 to FIG. 8, FIG. 11 and FIG. 13.

In the present embodiment, the warning display screen in FIG. 13 is not displayed. Instead, the setting for copy-forgery-inhibited pattern printing on one side to be printed is made automatically depending on the setting for copy-forgery-inhibited pattern printing on the other side to be printed.

Specifically, in the present embodiment, when after the setting of "a character is made to be outlined character" is made in the setting for copy-forgery-inhibited pattern printing on the front side, the setting of "a character is made to be outlined character" is made in a detailed setting for copy-forgery-inhibited pattern printing on the rear side, the following processing is performed. In other words, in the setting for copy-forgery-inhibited pattern printing on the front side, the setting of "a character is made to be outlined character" is automatically cancelled. As described above, where such a setting is made by the determination means that a copy-forgery-inhibited pattern image in which a character portion is rendered to a minor dot portion is printed on one side of a sheet, it is prohibited that the copy-forgery-inhibited pattern image in which the character portion is rendered to the minor dot portion is printed on the other side of the sheet.

Further, in the present embodiment, when after the setting of "a character is made to be outlined character" is made in the setting for copy-forgery-inhibited pattern printing on the rear side, the setting of "a character is made to be outlined character" is made in the setting for copy-forgery-inhibited pattern printing on the front side, the following processing is performed. Specifically, the setting of "a character is made to be outlined character" is automatically cancelled in the setting for copy-forgery-inhibited pattern printing on the rear side. As described above, where such a setting is made by the determination means that a copy-forgery-inhibited pattern image in which a character portion is rendered to a minor dot portion is printed on one side of a sheet, it is prohibited that the copy-forgery-inhibited pattern image in which the character portion is rendered to the minor dot portion is printed on the other side of the sheet.

Specifically, in the present embodiment, a priority is given to the setting for copy-forgery-inhibited pattern printing on the side for which the setting of "a character is made to be outlined character" is made later. Then, where the setting of "a character is made to be outlined character" is made both in the setting for copy-forgery-inhibited pattern printing on the front side and in the setting for copy-forgery-inhibited pattern printing on the rear side, the setting of "a character is made to be outlined character" on the side for which the setting for copy-forgery-inhibited pattern printing has been first made is cancelled.

Also, in the present embodiment, where such a setting is not made that a copy-forgery-inhibited pattern image in which a character portion is rendered to a minor dot portion is printed on one side of a sheet, as a matter of course, it is allowed that the setting is made that the copy-forgery-inhibited pattern image in which the character portion is rendered to the minor dot portion is printed on the other side of the sheet.

Figure 20:
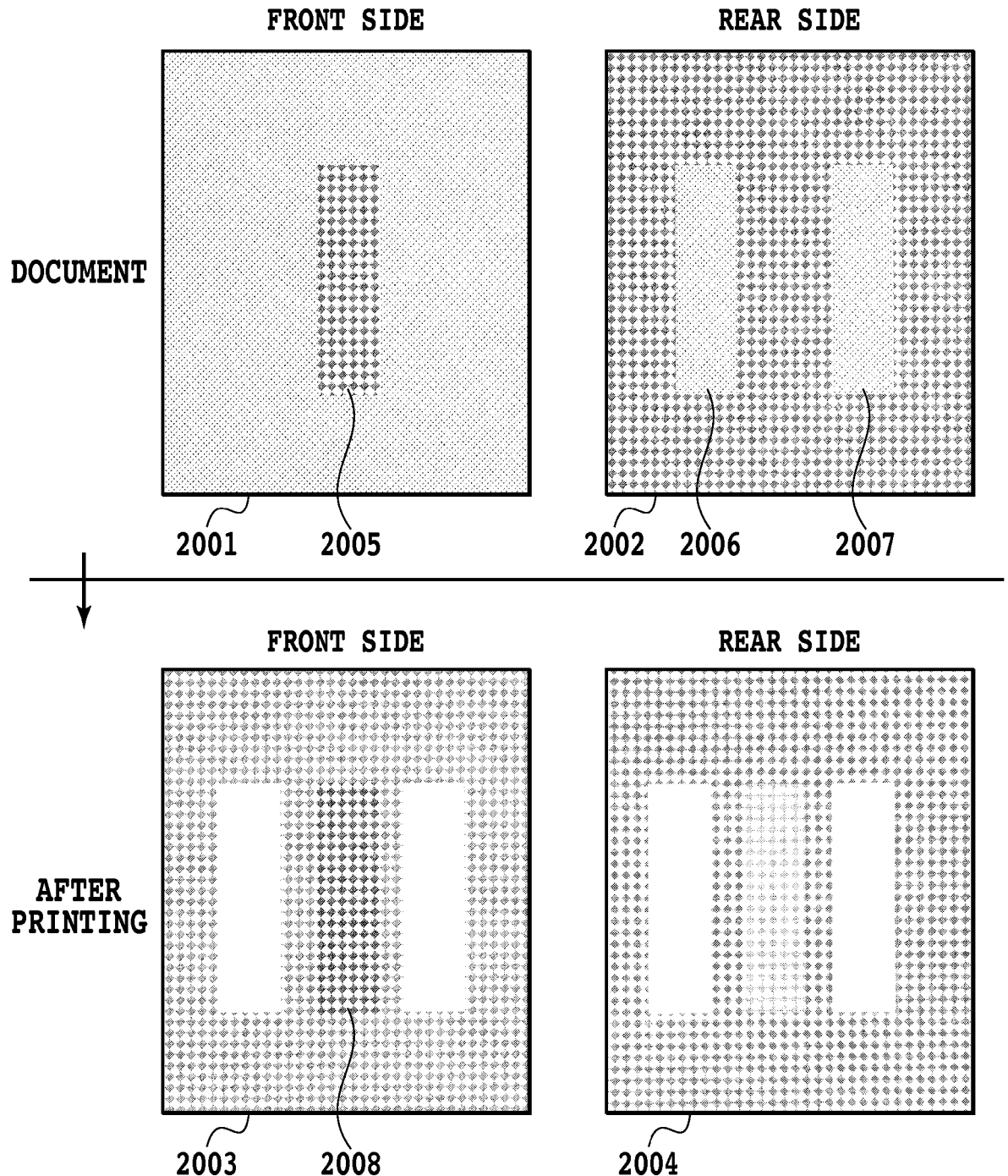
FIG. 20 is a view showing a case where the character portion in the copy-forgery-inhibited pattern image is set on printing of both sides so that the front side is a latent image and the rear side is made to be outlined character.

In FIG. 20, a character portion 2005 is a major dot portion on the front side 2001 of a document, and character portions 2006, 2007 are minor dot portions on the rear side 2002 of the document. In such a case, the character portion 2005 on the front side 2001 of the document is rendered to a state of 2008 on printing and visualized. Further, a non-character portion on the rear side 2002 of the document remains thick on the printing, by which this thick remaining portion has a showthrough. Thereby, on the front side of the printing, influences of this showthrough make it difficult to distinguish the character portion 2008 from the periphery thereof.

On the other hand, on the rear side of the printing, the character portion can easily be distinguished from the periphery. This is due to the fact that the major dot portion on the front side is small as with 2008 and less influenced by the showthrough.

The above situation is allowed by ordinary users. It is true that influences of the showthrough make it difficult to distinguish the character portion from the periphery on the front side. However, the character portion can be clearly distinguished from the periphery on the rear side. And for these ordinary users, in the first embodiment to the third embodiment, the setting for copy-forgery-inhibited pattern printing as shown in FIG. 20 is allowed. To be more specific, where the setting as shown in FIG. 18 is attempted to be made, this setting in FIG. 18 is prohibited and the setting for copy-forgery-inhibited pattern printing shown in FIG. 20 is made.

However, very demanding users will not allow the above-described situation with the fact that the character portion is less likely to be distinguished from the periphery thereof in terms of expression.

With the above situation taken into account, the following constitution may also be available for the demanding users. Specifically, where a CPU determines that such a setting has been made that a copy-forgery-inhibited pattern image is printed on both sides of a sheet, a character portion of the copy-forgery-inhibited pattern image is automatically rendered to a major dot portion. Then, the CPU controls so as to print the copy-forgery-inhibited pattern image.

Alternatively, where the CPU determines that such a setting has been made that a copy-forgery-inhibited pattern image is printed on both sides of a sheet, the CPU determines whether the setting of "a character is made to be outlined character" has been made at least on one side. Where the setting of "a character is made to be outlined character" is made at least on one side, the setting of "a character is made to be outlined character" (or setting for printing a copy-forgery-inhibited pattern image) is cancelled by the CPU. After the cancellation, a user is again instructed to make the setting for printing the copy-forgery-inhibited pattern image (setting for rendering the character portion to the major dot portion).

Fourth Embodiment

In first embodiment, where the setting of "a character is made to be outlined character" is made both in the setting for copy-forgery-inhibited pattern printing on the front side and in the setting for copy-forgery-inhibited pattern printing on the rear side, the warning display is provided. Further, in the second embodiment, where the setting of "a character is made to be outlined character" is made in the setting for copy-forgery-inhibited pattern printing on one side to be printed, it is prohibited that the setting of "a character is made to be outlined character" is made in the setting for copy-forgery-inhibited pattern printing on the other side to be printed. Still further, in the third embodiment, where the setting of "a character is made to be outlined character" is made in the setting for copy-forgery-inhibited pattern printing on one side to be printed, the setting for copy-forgery-inhibited pattern printing on the other side to be printed is automatically made.

However, showthrough will not necessarily take place only in copy-forgery-inhibited pattern printing but may take place where the image data to be printed has many portions with high density. Usually, where an original copy is at a density equal to or higher than a certain density, the density is also kept on printing, thus resulting in showthrough on the printing.

Therefore, in order to improve the usability of users, where, irrespective of the setting for copy-forgery-inhibited pattern, printing at a density higher than a predetermined density which may cause showthrough is given to a part wider than a predetermined area on one side, it is necessary to change the setting for copy-forgery-inhibited pattern printing on the other side to be printed. This is because such a fact is prevented that the showthrough on printing makes it impossible to distinguish a character portion from the periphery thereof.

Therefore, in the fourth embodiment, the setting for copy-forgery-inhibited pattern printing on one side to be printed is automatically cancelled on the basis of image data on the other side to be printed.

In the present embodiment, in Step S906 of the flowchart of copy motions shown in FIG. 9, the setting for copy-forgery-inhibited pattern when printing on the rear side is automatically changed based on the counting of density data of an image printed on the front side and the counting result.

Figure 21:
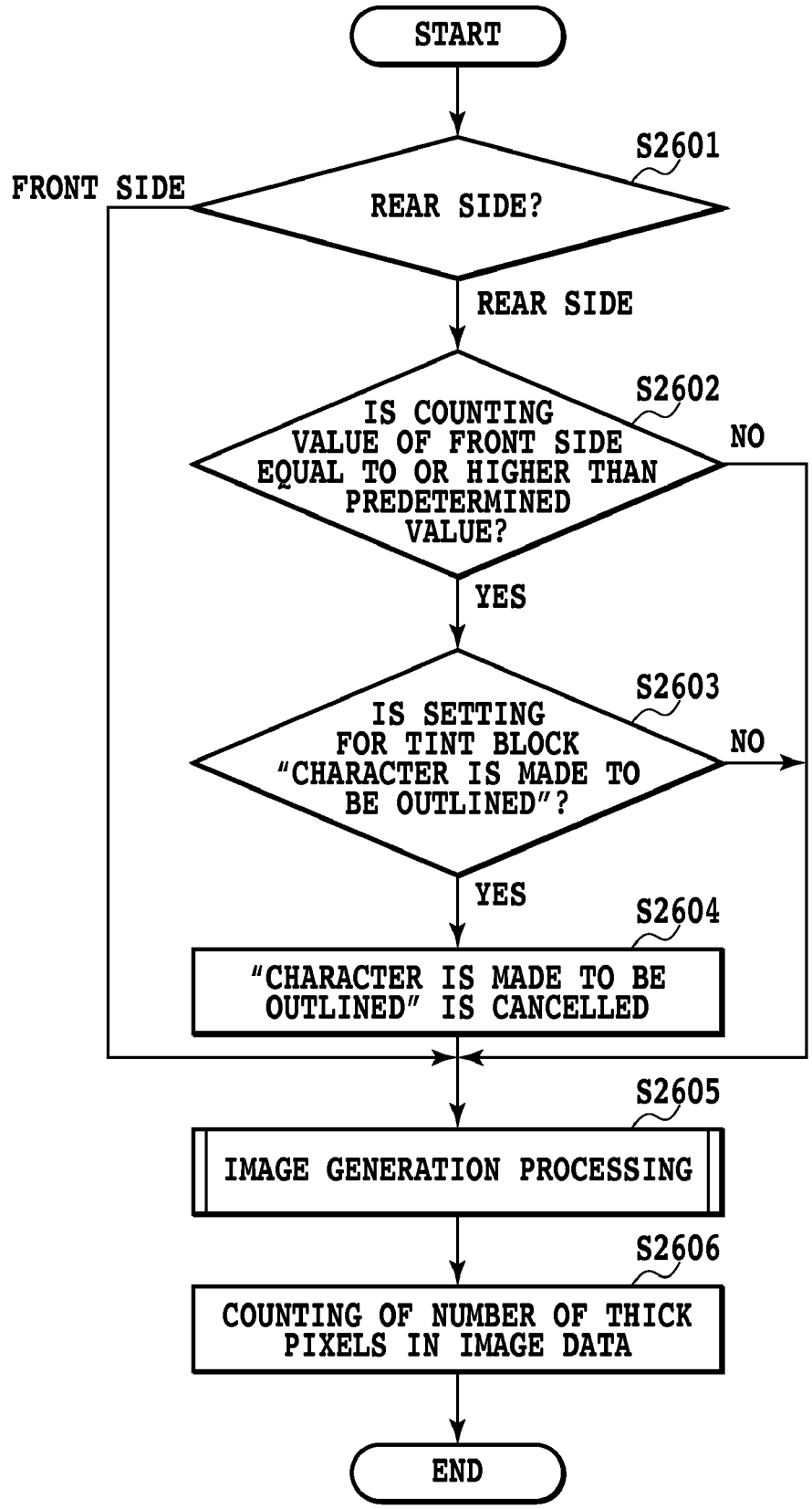
FIG. 21 is a flowchart which shows the processing of change in the setting for the copy-forgery-inhibited pattern in the fourth embodiment.

FIG. 21 is a view for describing the specific processing in the present embodiment in Step S906 in FIG. 9. It is noted that the processing of the flowchart shown in FIG. 21 is executed by the CPU mounted on the image forming apparatus in FIG. 3.

First, in Step S2601 in FIG. 21, a determination is made for whether a side which is being printed by the image forming apparatus is the front side or the rear side of a sheet. In such a case, the "front side" is one side which is first printed on a sheet. Further, the "rear side" is a not-yet-printed side of the sheet, the other side of which has already been printed.

In Step S2601, where a printed side is determined to be the "front side," the processing proceeds to Step S2605.

On the other hand, in Step S2601, where the printed side is determined to be the "rear side," the processing proceeds to Step S2602.

In Step S2602, since a side to be printed is the "rear side," a determination is made for whether a counting value of thick pixels on the corresponding "front side" which has already been printed is equal to or higher than a predetermined value. The counting value of the thick pixels will be described later in Step S2606.

In Step S2602, where the counting value is determined to be equal to or higher than a predetermined value, the processing proceeds to Step S2603. In such a case, the "front side" has a portion which has been thickly printed at a density equal to or higher than a predetermined density wider than a predetermined area on a sheet, in other words, a part in an area which will cause showthrough is large, thus resulting in a greater influence of showthrough.

In Step S2602, where a determination is made that the counting value is smaller than a predetermined value, the processing proceeds to Step S2605.

In Step S2603, a determination is made for whether the setting for copy-forgery-inhibited pattern is made.

In Step S2603, where a determination is made that the setting for copy-forgery-inhibited pattern has been made, the processing proceeds to Step S2604.

On the other hand, in Step S2603, where a determination is made that the setting for copy-forgery-inhibited pattern has not been made, the processing proceeds to Step S2605.

In Step 2604, the setting for copy-forgery-inhibited pattern printing is automatically cancelled. Thereby, where a thickly printed part at which the front side is showthrough is wide, the following processing is carried out. Specifically, the setting for copy-forgery-inhibited pattern printing on the rear side, that is, "a character is made to be outlined character" is automatically cancelled, thus, making it possible to prevent such a defect that there is a greater difficulty in obtaining the effect of copy-forgery-inhibited pattern due to the showthrough on printing. It is noted that prior to cancellation of the setting for copy-forgery-inhibited pattern, notification may be performed to a user. In such a case, a fact that "the effect of copy-forgery-inhibited pattern is not obtained, or the effect of copy-forgery-inhibited pattern is weak, specifically, a major dot region in the copy-forgery-inhibited pattern is less effectively struck up on printing" may be notified. Further, this notification may be displayed on a display portion 312 in FIG. 3.

As described in Step S2605 with reference to FIG. 10, a copy-forgery-inhibited pattern-fixed image is generated. A description of Step S2605 will be omitted here because there is no difference between the processing described in the first embodiment.

Next, counting is made in Step S2606 for how many pixels having a density higher than a predetermined value exist on a side to be printed in the image data to be printed. Thereby, counting is made for how many pixels exist at a part of a sheet having a density equal to or higher than a predetermined density, specifically, how large an area which will cause showthrough exists. In Step S2605, since the copy-forgery-inhibited pattern has already been added, counting is made for the number of pixels having a density equal to or greater than a predetermined density with respect to an image to which the copy-forgery-inhibited pattern has already been added. The counting value is retained at the RAM of the image forming apparatus and will be referred to on printing of the next side.

As described above, the processing shown in FIG. 21 is completed.

Where printing is given at a density higher than a predetermined density to a part of printing image data on the front side which is wider than a predetermined area, the above processing can be used to cancel the setting for copy-forgery-inhibited pattern on the rear side. Thus, it is possible to prevent such a defect that copy-forgery-inhibited pattern characters are made less distinguishable by the showthrough.

The above description has been given of an example that the setting for copy-forgery-inhibited pattern printing on the rear side which will cause a defective is automatically cancelled where the front side is thickly printed. However, this is only one example, and where the thick printing is given to the rear side, the present embodiment may be used so that the setting for copy-forgery-inhibited pattern printing on the front side which will cause a defective due to the showthrough is automatically cancelled.

In the fourth embodiment, a detailed description has been given of one example in which where thick printing has been given to the front side, the setting for copy-forgery-inhibited pattern printing on the rear side which may cause a defective due to the showthrough is automatically cancelled. This is only one example, and in the fourth embodiment, as shown in the first embodiment, a warning may be given to a user to accept the change in the setting for copy-forgery-inhibited pattern printing on the rear side from the user. Further, also as shown in the second embodiment, where the thick printing is given to the front side, the setting for copy-forgery-inhibited pattern printing on the rear side which will cause a defective due to the showthrough may be prohibited on the user interface.

Other Embodiment

In the first embodiment to the fourth embodiment, a detailed description has been given of a case in which where a copy-forgery-inhibited pattern image is generated on both sides of a sheet, the setting for copy-forgery-inhibited pattern printing which will cause a defective due to the showthrough at least on one side of the sheet is prevented. However, this is only one example. Where a copy-forgery-inhibited pattern image is generated on both sides of a sheet, the setting for copy-forgery-inhibited pattern printing which will cause a defective due to the showthrough on both sides of the sheet may be prevented.

Further, an object of the present invention is attained by a computer executing reading of a program code for realizing procedures of the flowchart described in the above embodiment from a storage medium which stores the program code. In such a case, the program code in itself read from the storage medium will realize the functions of the above-described embodiments. Thus, the program code and the storage medium which stores this program code are able to constitute the present invention.

The storage media for supplying the program code include, for example, floppy disks (registered trademark), hard disks, optical disks, magnetooptical disks, CD-ROMs, CD-Rs, magnetic tapes, non-volatile memory cards and ROMs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-078910, filed Mar. 25, 2008, which is hereby incorporated by reference herein in its entirety.

What is claimed is:

1. An apparatus comprising:
   a determination unit configured to determine whether a setting is being made for printing an image in which, on one side of a sheet, smaller dots are arranged in a character portion and larger dots are arranged in an periphery portion of the character portion; and
   a control unit configured to control, in a case where the determination unit determines that the setting is being made, to permit setting for printing an image in which, on the other side of the sheet, larger dots are arranged in a character portion and smaller dots are arranged in an periphery of the character portion, but not to permit setting for printing an image in which, on said other side of the sheet, smaller dots are arranged in a character portion and larger dots are arranged in an periphery of the character portion.

2. A method comprising the steps of:
   determining whether setting is being made for printing an image in which, on one side, smaller dots are arranged in a character portion and larger dots are arranged in a periphery of the character portion; and
   controlling, in a case where it is determined in the determination step that the setting is being made, to permit setting for printing an image in which, on the other side, larger dots are arranged in a character portion and smaller dots are arranged in an periphery of the character portion, but not to permit setting for printing an image in which, on said other side, smaller dots are arranged in a character portion and larger dots are arranged in an periphery of the character portion.

3. A program stored in a non-transitory computer readable storage medium for causing a computer to perform the method according to claim 2.

* * * * *